United States Patent
Inaba et al.

(10) Patent No.: US 9,581,370 B2
(45) Date of Patent: Feb. 28, 2017

(54) REFRIGERANT CYCLE DEVICE

(75) Inventors: Atsushi Inaba, Okazaki (JP); Satoshi Itoh, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 698 days.

(21) Appl. No.: 13/448,773

(22) Filed: Apr. 17, 2012

(65) Prior Publication Data

US 2012/0266622 A1    Oct. 25, 2012

(30) Foreign Application Priority Data

Apr. 21, 2011  (JP) ................................. 2011-095053
Mar. 6, 2012   (JP) ................................. 2012-049476

(51) Int. Cl.
F25B 1/00        (2006.01)
F25B 41/04       (2006.01)
(Continued)

(52) U.S. Cl.
CPC ......... *F25B 41/04* (2013.01); *B60H 1/00899* (2013.01); *F25B 1/10* (2013.01); *F25B 5/04* (2013.01); *F25B 2341/0662* (2013.01); *F25B 2400/0409* (2013.01); *F25B 2400/0411* (2013.01); *F25B 2400/23* (2013.01); *F25B 2600/2519* (2013.01)

(58) Field of Classification Search
CPC .... F25B 41/04; F25B 1/10; F25B 2400/0409; F25B 5/04; F25B 2400/0411; F25B 2341/0662; F25B 2600/2519; F25B 2400/23; B60H 1/00899

USPC ................. 62/160, 173, 175, 199, 200, 180
See application file for complete search history.

(56) References Cited

U.S. PATENT DOCUMENTS 5,046,325 A * 9/1991 Kuwahara ................. F25B 1/10
                                                          62/156
5,355,689 A * 10/1994 Hara ................... B60H 1/00814
                                                          62/159
(Continued)

FOREIGN PATENT DOCUMENTS

JP   S59-189246   10/1984
JP   H04-353011   12/1992
(Continued)

OTHER PUBLICATIONS

Office action dated Mar. 26, 2014 in corresponding Chinese Application No. 2012 10112444.5.
(Continued)

*Primary Examiner* — Allana Lewin Bidder
*Assistant Examiner* — Kun Kai Ma
(74) *Attorney, Agent, or Firm* — Harness, Dickey & Pierce, P.L.C.

(57) ABSTRACT

When a temperature of feed air blown into a space for air conditioning cannot be increased up to the target temperature in an indoor condenser of a heat pump cycle included in a gas injection cycle, the volume of the feed air flowing into the indoor condenser is decreased. Thus, the temperature of the refrigerant condensed by the indoor condenser is increased, while the amount of a compression work in a high-pressure side compression stage of the compressor is increased, which suppresses the lack of the heating capacity of the feed air blown into the space for air conditioning.

19 Claims, 20 Drawing Sheets

COOLING OPERATION MODE /
DEHUMIDIFICATION AND HEATING OPERATION MODE

(51) Int. Cl.
*B60H 1/00* (2006.01)
*F25B 1/10* (2006.01)
*F25B 5/04* (2006.01)

(56) References Cited

U.S. PATENT DOCUMENTS

| | | | | |
|---|---|---|---|---|
| 5,704,219 | A * | 1/1998 | Suzuki et al. | 62/222 |
| 6,212,900 | B1 * | 4/2001 | Iritani et al. | 62/428 |
| 6,237,351 | B1 * | 5/2001 | Itoh | B60H 1/00921 62/113 |
| 6,327,852 | B1 * | 12/2001 | Hirose | 60/297 |
| 6,460,357 | B1 * | 10/2002 | Doi | F25B 1/10 62/199 |
| 7,556,090 | B2 * | 7/2009 | Asai et al. | 165/202 |
| 2004/0103675 | A1 * | 6/2004 | Tomita | 62/157 |
| 2005/0178523 | A1 * | 8/2005 | Itoh | B60H 1/00385 165/42 |
| 2006/0083626 | A1 * | 4/2006 | Manole | F04B 3/00 417/245 |
| 2008/0276636 | A1 * | 11/2008 | Thybo et al. | 62/228.3 |
| 2011/0011125 | A1 * | 1/2011 | Kasahara | 62/498 |
| 2011/0016896 | A1 * | 1/2011 | Oomura | B60H 1/00785 62/155 |
| 2011/0167850 | A1 * | 7/2011 | Itoh | F25B 5/04 62/160 |
| 2012/0227427 | A1 * | 9/2012 | Liu | F25B 1/10 62/115 |

FOREIGN PATENT DOCUMENTS

| | | |
|---|---|---|
| JP | H05-042814 | 2/1993 |
| JP | H06-032135 | 2/1994 |
| JP | H09-086149 | 3/1997 |
| JP | 2001-324237 | 11/2001 |

OTHER PUBLICATIONS

Office action dated Oct. 14, 2014 in corresponding Chinese Application No. 2012 10112444.5.
Office Action mailed Mar. 9, 2015, issued in the corresponding CN application No. 201210112444.5.
Office Action mailed Apr. 28, 2015, issued in the corresponding JP application No. 2012084902.

* cited by examiner

COOLING OPERATION MODE /
DEHUMIDIFICATION AND HEATING OPERATION MODE

HEATING OPERATION MODE (COOLING OPERATION MODE)

(FIRST DEHUMIDIFICATION AND HEATING MODE)

(SECOND DEHUMIDIFICATION AND HEATING MODE)

(THIRD DEHUMIDIFICATION AND HEATING MODE)

(FOURTH DEHUMIDIFICATION AND HEATING MODE)

(HEATING OPERATION MODE)

SUB-COOL CONTROL /
DRYNESS CONTROL

A/M VOLUME CONTROL

FIG. 17

| | | TRANSFER FROM SUB-COOL CONTROL TO DRYNESS CONTROL | TRANSFER FROM DRYNESS CONTROL TO A/M VOLUME CONTROL |
|---|---|---|---|
| FLOW RATE OF REFRIGERANT FLOWING THROUGH OUTDOOR HEAT EXCHANGER | Gr1 | ALMOST NOT CHANGED | NOT CHANGED |
| INJECTION FLOW RATE | Gr2 | INCREASED | NOT CHANGED |
| INCREASE IN SPECIFIC ENTHALPY AT LOW-PRESSURE SIDE COMPRESSION MECHANISM | $\Delta ic1$ | INCREASED | NOT CHANGED |
| INCREASE IN SPECIFIC ENTHALPY AT HIGH-PRESSURE SIDE COMPRESSION MECHANISM | $\Delta ic2$ | DECREASED | INCREASED (DUE TO INCREASE IN COMPRESSION RATIO) |
| COMPRESSION WORK AMOUNT OF LOW-PRESSURE SIDE COMPRESSION MECHANISM | $Lc1 = Gr1 \times \Delta ic1$ | INCREASED | NOT CHANGED |
| COMPRESSION WORK AMOUNT OF HIGH-PRESSURE SIDE COMPRESSION MECHANISM | $Lc2 = (Gr1+Gr2) \times \Delta ic2$ | INCREASED OR DECREASED ACCORDING TO CONDITIONS | INCREASED |
| DIFFERENCE IN ENTHALPY BETWEEN INLET AND OUTLET OF INDOOR HEAT EXCHANGER | $\Delta ie$ | SLIGHTLY DECREASED | NOT CHANGED |
| HEAT ABSORPTION AMOUNT AT OUTDOOR HEAT EXCHANGER | $Qe = Gr1 \times \Delta ie$ | SLIGHTLY DECREASED | NOT CHANGED |
| HEATING CAPACITY | $Qh = Lc1 + Lc2 + Qe$ | LARGE INFLUENCE DUE TO INCREASE OR DECREASE IN LC2 | INCREASED |

REFRIGERANT CYCLE DEVICE

CROSS REFERENCE TO RELATED APPLICATION

This application is based on Japanese Patent Applications No. 2011-095053 filed on Apr. 21, 2011, No. 2012-049476 filed on Mar. 6, 2012, and No. 2012-84902 filed on Apr. 3, 2012, the contents of which are incorporated herein by reference in its entirety.

TECHNICAL FIELD

The present disclosure relates to a refrigerant cycle device using a vapor compression refrigerant cycle, which can be effectively used for vehicles.

BACKGROUND OF THE INVENTION

Multistage-compression heat pump cycles have been hitherto known which increases the pressure of refrigerant through multiple stages so as to improve a cycle efficiency (COP) of a heat pump cycle (vapor compression refrigerant cycle).

For example, Patent Document 1 (U.S. Pat. No. 5,704,219 corresponding to JP 9-86149A) discloses the so-called gas injection cycle (economizer refrigerant cycle) which includes a compressor with a suction port for sucking refrigerant, a discharge port for discharging refrigerant, and an intermediate pressure port for allowing an intermediate-pressure refrigerant in the cycle to flow thereinto and for mixing the refrigerant with another refrigerant whose pressure is being increased.

Such a gas injection cycle compressor increases the pressure of the refrigerant through two compression stages, specifically, a low-pressure side compression stage for increasing the pressure of the low-pressure refrigerant into an intermediate-pressure refrigerant, and a high-pressure side compression stage for increasing the pressure of the intermediate-pressure refrigerant into a high-pressure refrigerant. Thus, the pressure of the intermediate-pressure refrigerant flowing from the intermediate-pressure port is adjusted to an appropriate level, so that the compression efficiency of the compressor can be improved to thereby improve the cycle efficiency.

The gas injection cycle disclosed in Patent Document 1 is applied to an air conditioner for a vehicle, and thus designed to heat feed air as a fluid for heat exchange by exchanging heat between a high-temperature and high-pressure refrigerant discharged from the compressor and the feed air blown into a vehicle interior by a user-side heat exchanger (indoor condenser) upon heating the vehicle interior as a space of interest for air conditioning.

In a normal operation, the user-side heat exchanger can exhibit enough heating capacity to increase the temperature of the feed air to a target temperature required for heating the vehicle interior. At this time, the opening degree of a high-pressure side expansion valve for decreasing the pressure of the refrigerant flowing from the user-side heat exchanger is adjusted to achieve the maximum cycle efficiency. In contrast, the user-side heat exchanger sometimes lacks the heating capacity for increasing the temperature of the feed air to the target temperature. In this case, the opening degree of the high-pressure side expansion valve is increased as compared to the normal operation.

Thus, it is required that in the normal operation, the cycle is operated while achieving the high cycle efficiency, while upon lacking the heating capacity, the heating capacity of the user-side heat exchanger is to be improved by increasing the flow rate of refrigerant (amount of gas injection) flowing thereinto from the intermediate-pressure port of the compressor.

SUMMARY OF THE INVENTION

The present disclosure has been made in view of the forgoing points, and it is an object of the present disclosure to reduce the lack of the heating capacity of a user-side heat exchanger for a fluid for heat exchange in a refrigerant cycle device adapted to heat the fluid of interest using the user-side heat exchanger.

In order to achieve the above object, according to a first aspect of the present disclosure, a refrigerant cycle device includes: a compressor configured to compress a low-pressure refrigerant sucked from a suction port and to discharge a high-pressure refrigerant from a discharge port, while allowing an intermediate-pressure refrigerant in a refrigerant cycle to flow thereinto to combine the intermediate-pressure refrigerant with the refrigerant under a compression stage via an intermediate-pressure port; a user-side heat exchanger configured to exchange heat between the high-pressure refrigerant discharged from the discharge port and a fluid for heat exchange to thereby heat the fluid for heat exchange; a high-pressure side decompressor configured to decompress the high-pressure refrigerant flowing from the user-side heat exchanger into an intermediate-pressure refrigerant; a gas-liquid separator configured to separate the intermediate-pressure refrigerant decompressed by the high-pressure side decompressor into gas and liquid phases to flow out the separated gas-phase refrigerant toward the intermediate-pressure port; a low-pressure side decompressor configured to decompress the liquid-phase refrigerant separated by the gas-liquid separator into a low-pressure refrigerant; an evaporator configured to evaporate the low-pressure refrigerant decompressed by the low-pressure side decompressor and to flow out the refrigerant toward the suction port; and a flow rate adjustment portion configured to adjust a flow rate of the fluid for heat exchange which is to flow into the user-side heat exchanger. In the refrigerant cycle device, when a temperature of the fluid for heat exchange adjusted by at least the user-side heat exchanger is equal to or less than a target temperature of the fluid for heat exchange, the flow rate adjustment portion decreases the flow rate of the fluid for heat exchange which is to flow into the user-side heat exchanger.

Thus, when the temperature of the fluid for the heat exchange whose temperature has been adjusted by at least the user-side heat exchanger becomes equal to or less than the target temperature of the fluid, the flow rate of the fluid flowing into the user-side heat exchanger is decreased, which temporarily decreases the amount of heat dissipated from the refrigerant at the user-side heat exchanger. Thus, the cycle balance of the refrigerant cycle is achieved such that the refrigerant pressure within the user-side heat exchanger is increased.

Thus, the temperature of the discharge refrigerant from the compressor is increased, which can increase a difference in temperature between the refrigerant flowing through the user-side heat exchanger and the fluid for heat exchange flowing into the user-side heat exchanger. Further, the amount of compression work in the compression stage from the intermediate-pressure port of the compressor to the discharge port thereof can be increased, which can increase a difference in enthalpy between an inlet and an outlet of the user-side heat exchanger.

As a result, the lack of the heating capacity of the user-side heat exchanger for the fluid for heat exchange can be suppressed.

The term "fluid for the heat exchange whose temperature is adjusted by at least the user-side heat exchanger" as used in the present application means not only the fluid for the heat exchange whose temperature is adjusted only by the user-side heat exchanger, but also a fluid for the heat exchange whose temperature is adjusted by both the user-side heat exchanger and another temperature adjustment portion.

For example, the above term "fluid" means a fluid for the heat exchanger that is cooled by an evaporator and then heated again by the user-side heat exchanger, or a fluid for the heat exchange that is produced by mixing the fluid for the heat exchange heated by the user-side heat exchanger with another fluid for the heat exchange not heated by the user-side heat exchanger.

Thus, the phrase "when the temperature of the fluid for the heat exchange whose temperature is adjusted by at least the user-side heat exchanger is equal to or less than the target temperature of the fluid for the heat exchange" as used herein can be represented by the phrase "when the entire refrigerant cycle cannot dissipate heat for increasing the temperature of the fluid for the heat exchange up to the target temperature at the user-side heat exchanger".

The term "target temperature" as used herein is not limited to a target value under control of the cycle, and can include a wide range of temperature required for the fluid for the heat exchange whose temperature is adjusted as the entire refrigerant cycle device. That is, the term "target temperature" as used herein can be represented by the term "desired temperature required for the fluid for the heat exchange".

According to a second aspect of the present disclosure, when the temperature of the fluid for heat exchange adjusted by at least the user-side heat exchanger is equal to or less than the target temperature of the fluid for heat exchange, the high-pressure side decompressor may increase a throttle opening degree.

Thus, the flow rate of refrigerant flowing from the intermediate-pressure port of the compressor (gas injection amount) can be increased by causing a high-pressure side decompressor to increase a throttle opening degree, which can further reduce the lack of the heating capacity of the user-side heat exchanger for the fluid for the heat exchange.

According to a third aspect of the present disclosure, the fluid for heat exchange may be feed air blown into a vehicle compartment. In this case, the user-side heat exchanger may be disposed in a casing forming an air passage for the feed air, a bypass passage may be provided in the casing to allow the feed air to bypass the user-side heat exchanger, and the flow rate adjustment portion may include an air mix door for adjusting a rate of the volume of the feed air passing through the user-side heat exchanger to that of the feed air passing through the bypass passage among the feed airs.

According to a fourth aspect of the present disclosure, in the refrigerant cycle device, an air mix door controller may be configured to control an operation of the air mix door. In this case, when the temperature of the feed air adjusted by at least the user-side heat exchanger is equal to or less than the target temperature of the feed air, the air mix door controller is adapted to delay responsivity of the operation of the air mix door as compared to when the temperature of the feed air adjusted by the user-side heat exchanger is higher than the target temperature of the feed air.

When the volume of feed air passing through the user-side heat exchanger is decreased by the air mix door, the responsivity of the operation of the air mix door is delayed, which can reduce the rapid decrease in temperature of the feed air blown into the vehicle interior until the cycle balance of the refrigerant cycle is stabilized. As a result, the reduction in comfort of the vehicle interior can be suppressed.

Furthermore, the refrigerant cycle device according to a fifth aspect of the present disclosure may be provided with a heat exchange capacity changing portion that is configured to change a heat exchange capacity between the refrigerant and the feed air in the user-side heat exchanger. In this case, when the temperature of the feed air adjusted by at least the user-side heat exchanger is equal to or less than the target temperature of the feed air, the heat exchange capacity changing portion may reduce the heat exchange capacity.

When the volume of feed air passing through the user-side heat exchanger is decreased by the air mix door, the heat exchange capacity of the user-side heat exchanger can be reduced to promote the increase in pressure of the refrigerant in the user-side heat exchanger, which can reduce the rapid decrease in temperature of the feed air blown into the vehicle interior.

The term "heat exchange capacity" as used in the present application means a change in amount of heat of the feed air blown into the user-side heat exchanger before and after passing through the user-side heat exchanger. The smaller the change in amount of heat of the feed air before and after passing through the user-side heat exchanger, the less the heat exchange capacity. The larger the change in amount of heat of the feed air before and after passing through the user-side heat exchanger, the more the heat exchange capacity.

According to a sixth aspect of the present disclosure, the heat exchange capacity changing portion may include a blower which blows the feed air toward the user-side heat exchanger and the bypass passage. In this case, when the temperature of the feed air adjusted by at least the user-side heat exchanger is equal or less than the target temperature of the feed air, the blower decreases the volume of the feed air passing through each of the user-side heat exchanger and the bypass passage.

Furthermore, according to a seventh aspect of the present disclosure, the heat exchange capacity changing portion may include an inside/outside air adjustment portion for changing a ratio of introduction of air inside the vehicle compartment to air outside the vehicle compartment into the casing. In this case, when the temperature of the feed air adjusted by at least the user-side heat exchanger is equal to or less than the target temperature of the feed air, the inside/outside air adjustment portion increases the ratio of introduction of the air inside the vehicle compartment to the air outside the vehicle compartment.

According to an eighth aspect of the present disclosure, the fluid for heat exchange may be feed air blown into a vehicle compartment. In this case, the user-side heat exchanger may be disposed in the casing forming an air passage for the feed air, and the flow rate adjustment portion may include a blower for blowing the feed air toward the user-side heat exchanger.

According to a ninth aspect of the present disclosure, a refrigerant cycle device includes: a compressor configured to compress a low-pressure refrigerant sucked thereinto from a suction port and to discharge a high-pressure refrigerant from a discharge port, while allowing an intermediate-pressure refrigerant in a refrigerant cycle to flow thereinto to combine the intermediate-pressure refrigerant with the refrigerant under a compression stage via an intermediate-pressure port; a user-side heat exchanger configured to exchange heat between the high-pressure refrigerant discharged from the discharge port and a fluid for heat exchange to thereby heat the fluid for heat exchange; a second user-side heat exchanger configured to exchange heat between the refrigerant and the fluid for heat exchange to allow the refrigerant to flow toward the suction port; an outdoor heat exchanger configured to exchange heat between the refrigerant and an outside air; a first decompressor configured to decompress the refrigerant flowing from the first user-side heat exchanger; a second decompressor configured to decompress the refrigerant which is to flow into the outdoor heat exchanger; a third decompressor configured to decompress the refrigerant which is to flow into the second user-side heat exchanger; a gas-liquid separator configured to separate the refrigerant flowing from the first user-side heat exchanger into gas and liquid phases; an intermediate-pressure refrigerant passage for guiding the gas-phase refrigerant separated by the gas-liquid separator to the intermediate-pressure port, and mixing the gas-phase refrigerant with the refrigerant under a compression stage; an accumulator configured to separate the refrigerant flowing into the suction port of the compressor into gas and liquid phases, and causes the separated gas-phase refrigerant to flow to the suction port of the compressor; a flow rate adjustment portion which adjusts a flow rate of a fluid for heat exchange which is to flow into the user-side heat exchanger; and a refrigerant flow path switching portion configured to switch between refrigerant flow paths through which the refrigerant circulates. Furthermore, in a cooling operation mode for cooling the fluid for heat exchange, the refrigerant flow path switching portion allows the refrigerant flowing from the first user-side heat exchanger to flow through the first decompressor, the gas-liquid separator, the outdoor heat exchanger, the third decompressor, the second user-side heat exchanger, and the accumulator in that order. In a heating operation mode for heating the fluid for heat exchange, the refrigerant flow path switching portion allows the refrigerant flowing from the first user-side heat exchanger to flow through the first decompressor, the gas-liquid separator, the second decompressor, the outdoor heat exchanger, and the accumulator in that order, while allowing the gas-phase refrigerant separated by the liquid-gas separator to flow into the intermediate-pressure refrigerant passage. Furthermore, in the heating operation mode, when a temperature of the fluid for heat exchange adjusted by at least the user-side heat exchanger is equal to or less than the target temperature of the fluid for heat exchange, the flow rate adjustment portion decreases the flow rate of the fluid for heat exchange which is to flow into the user-side heat exchanger.

Accordingly, in the heating operation mode for heating the fluid for the heat exchange, the lack of the heating capacity of the user-side heat exchanger for the fluid for the heat exchange can be reduced. Further, a refrigerant flow path switching portion can be provided to achieve a cooling operation mode for cooling the fluid for the heat exchange.

BRIEF DESCRIPTION OF THE DRAWINGS

FIG. 17 is a diagram showing the states of the refrigerant upon transferring from the sub-cool control, to the dryness control, and then to the air mix volume control in that order in the first embodiment;

DETAILED DESCRIPTION

The inventors of the present disclosure have found out the following facts associated with the related art. In the heat pump cycle disclosed in Patent Document 1, even when the opening degree of the high-pressure side expansion valve is increased at the time of lack of the capacity, the heating capacity is not improved in the user-side heat exchanger as requested. The inventors have examined the cause for the above matter, and as a result, found that the matter is caused by a decrease in enthalpy (hereinafter referred to as an "inlet/outlet enthalpy difference") of the refrigerant between the inlet and the outlet of the user-side heat exchanger.

Figure 26:
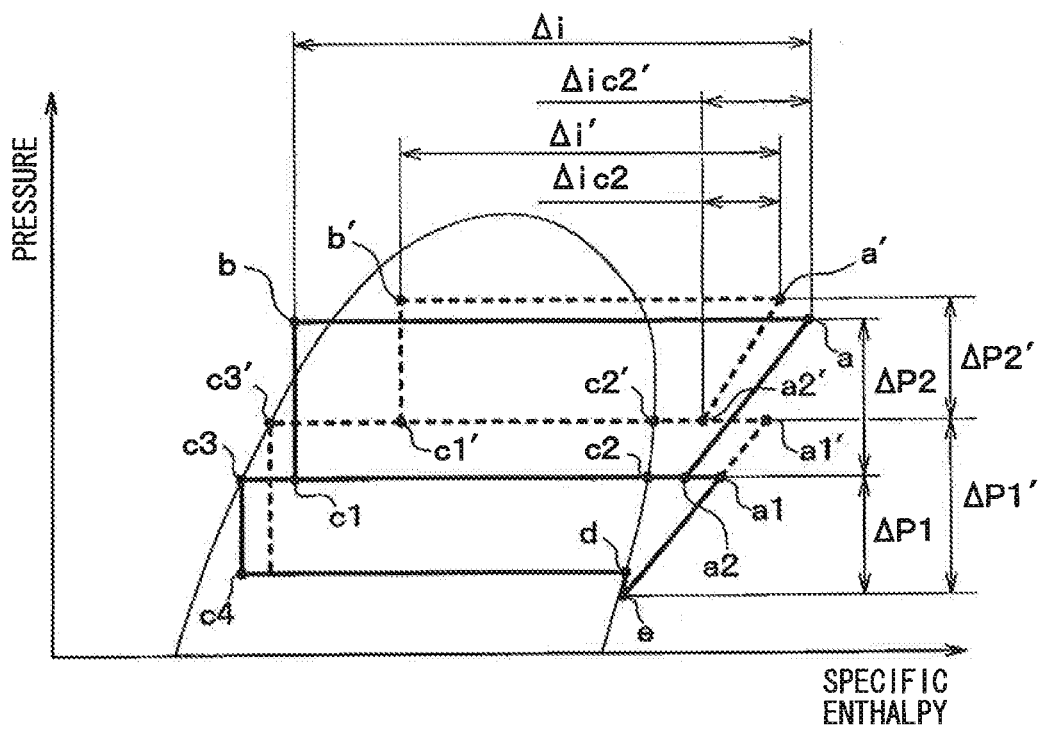
FIG. 26 is a Mollier chart showing the state of the refrigerant in a heat pump cycle in a comparative example.
Figure 27:
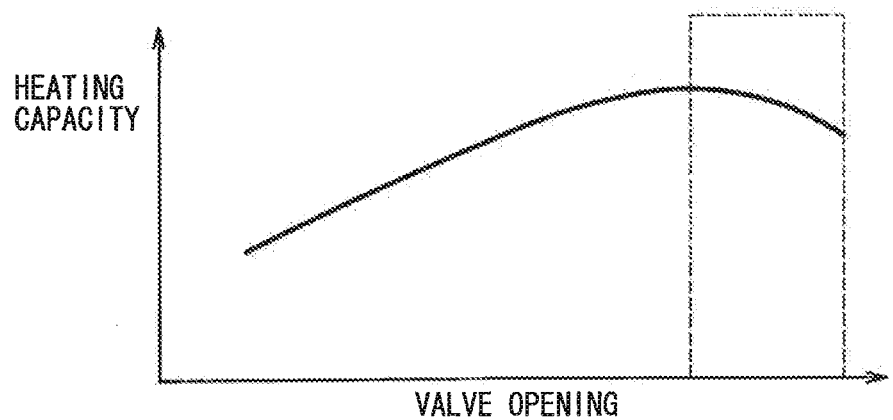
FIG. 27 is a graph showing the relationship between the opening degree of the high-pressure expansion valve and the heating capacity of the user-side heat exchanger.

As to this problem, comparative examples will be described using FIGS. 26 and 27. FIG. 26 is a Mollier chart showing the state of the refrigerant in the same heat pump cycle as that described in the following embodiment, in which the state of the refrigerant corresponding to the normal operation in the related art is indicated by a solid line, and the state of the refrigerant corresponding to the lack of the capacity in the related art is indicated by a broken line.

In FIG. 26, the refrigerant in the same state as that represented in the Mollier chart described in the following embodiments is represented by the same reference character. FIG. 27 is a graph showing the relationship between the opening of the high-pressure side expansion valve and the heating capacity of the user-side expansion valve.

As indicated by the solid line of FIG. 26, in the normal operation, the opening degree of the high-pressure side expansion valve is adjusted so as to maximize the cycle efficiency, so that the pressure of the intermediate-pressure refrigerant flowing thereinto from the intermediate-pressure port is adjusted to an appropriate value. The heating capacity of the user-side heat exchanger is defined as a value obtained by multiplying a refrigerant flow rate Gr of the refrigerant flowing through the user-side heat exchanger by a difference in enthalpy of the refrigerant between the inlet and the outlet of the user-side heat exchanger.

In order to improve the cycle efficiency in the normal operation of the heat pump cycle, the refrigerant flowing from the user-side heat exchanger (as indicated by a point b of FIG. 26) becomes a supercool liquid-phase refrigerant, and a difference in enthalpy of the refrigerant between the inlet and outlet of the user-side heat exchanger (indicated by Ai of FIG. 26) is enlarged.

When the opening degree of the high-pressure side expansion valve is increased at the time of lack of the capacity from the state in the normal operation, the refrigerant flowing from the user-side heat exchanger becomes a gas-liquid two-phase refrigerant (from the point b to a point b' in FIG. 26). Although the difference in enthalpy between the inlet and outlet of the user-side heat exchanger is decreased, the amount of gas injection is increased, so that the heating capacity of the user-side heat exchanger can be improved while the degree of the increase in gas injection amount is larger than the degree of the decrease in enthalpy between the inlet and outlet.

When the amount of gas injection is excessively increased, as shown in FIG. 26, the pressure of the intermediate-pressure refrigerant is increased (from a point c1 to a point c1' of FIG. 26), a difference in pressure between the discharge side pressure and the suction side pressure in the low-pressure side compression stage (from $\Delta P1$ to $\Delta P1'$ of FIG. 26) is increased, and a difference in pressure between the discharge side pressure and the suction side pressure in the high-pressure side compression stage (from $\Delta P2$ to $\Delta P2'$ of FIG. 26) is decreased.

When the compression work amount Lc2 is largely decreased in the high-pressure side compression stage (from $\Delta ic2$ to $\Delta ic2'$ of FIG. 26), the degree of the decrease in enthalpy of the refrigerant between the inlet and outlet of the user-side heat exchanger (from $\Delta ic2$ to $\Delta ic2'$ of FIG. 26) exceeds the degree of an increase in gas injection amount. As indicated by an area enclosed by a dotted line in FIG. 27, the heating capacity of the user-side heat exchanger is reduced.

The present disclosure has been made in view of the forgoing circumstances.

First Embodiment

Referring to FIGS. 1 to 17, a first embodiment of the invention will be described below. In this embodiment, the refrigerant cycle device of the invention is applied to an air conditioner 1 for a vehicle, of an electric motor that obtains a driving force for vehicle traveling from an electric motor for traveling. The refrigerant cycle device serves to cool or heat the feed air blown into a vehicle interior as a space of interest to be air-conditioned in the air conditioner 1 for a vehicle. Thus, the fluid for heat exchange of this embodiment is feed air.

The refrigerant cycle device includes a heat pump cycle (vapor compression refrigerant cycle) 10. The heat pump cycle 10 can switch between a refrigerant circuit in the cooling operation mode (cooling operation mode for cooling the feed air) for cooling the vehicle interior or in the dehumidification and heating operation mode (dehumidification operation mode) for dehumidifying and heating the vehicle interior as shown in the entire configuration diagram of FIG. 1, and a refrigerant circuit in the heating operation mode (heating operation mode for heating the feed air) for heating the vehicle interior as shown in the entire configuration diagram of FIG. 2.

The heat pump cycle 10 employs an HFC-based refrigerant as a refrigerant (specifically, R134a), and thus forms a vapor compression subcritical refrigerant cycle in which the high-pressure side refrigerant pressure Pd does not exceed the critical pressure of the refrigerant. It is apparent that the HFO-based refrigerant (for example, R1234yf) or the like may be used. Further, the refrigerant contains a refrigerating machine oil for lubricating the compressor 11, and a part of the refrigerating machine oil circulates through the cycle together with the refrigerant.

The compressor 11 among components of the heat pump cycle 10 is disposed within in a bonnet of the vehicle, and is adapted to suck, compress, and discharge the refrigerant in the heat pump cycle 10. The compressor 11 is a two-stage compression electric compressor which includes two compression mechanism comprised of a low-pressure side compression mechanism and a high-pressure side compression mechanism, each of which is comprised of a fixed capacity compression mechanism, and an electric motor for rotatably driving both the compression mechanisms in a housing formed as an outer envelope.

A housing of the compressor 11 is provided with a suction port 11a for sucking the low-pressure refrigerant from the outside of the housing into the low-pressure side compression mechanism, an intermediate-pressure portion 11b for allowing the intermediate-pressure refrigerant from the outside of the housing into the inside thereof to mix the refrigerant with another refrigerant under the compression stage from the low pressure to the high pressure, and a discharge port 11c for discharging the high-pressure refrigerant discharged from the high-pressure side compression mechanism toward the outside of the housing.

More specifically, the intermediate-pressure port 11b is coupled to a refrigerant outlet side of the low-pressure side compression mechanism (that is, a refrigerant inlet side of the high-pressure side compression mechanism). The low-pressure side compression mechanism and the high-pressure side compression mechanism can employ various types of compression mechanisms, such as a scroll-type compression mechanism, a vane-type compression mechanism, or a rolling piston type compression mechanism.

The electric motor has its operation (number of revolutions) controlled by a control signal output from an air conditioning controller 40 to be described later, and thus may use either an AC motor or a DC motor. And, the number of revolutions of the motor is controlled to change a refrigerant discharge capacity of the compressor 11. Thus, in this embodiment, the electric motor serves as a discharge capacity changing portion of the compressor 11.

This embodiment uses the compressor 11 accommodating two compression mechanisms in one housing, but the form of the compressor is not limited thereto. That is, as long as the intermediate-pressure refrigerant can flow into the intermediate-pressure port 11b to be mixed with another refrigerant under the compression stage from the low pressure to the high pressure, an electric compressor may be provided for accommodating one fixed capacity-type compression mechanism and an electric motor for rotatably driving the compression mechanism inside a housing.

The two compressors may be coupled in series, an inlet of the low-pressure side compressor disposed on the low-pressure side may be provided as a suction port 11a, and an outlet of the high-pressure side compressor disposed on the high-pressure side may be provided as a discharge port 11c. A coupling portion for coupling the outlet of the low-pressure side compressor to the inlet of the high-pressure side compressor may be provided as an intermediate-pressure port 11b. One two-stage compression compressor 11 may be comprised of both the low-pressure side compressor and the high-pressure side compressor.

The discharge port 11c of the compressor 11 is coupled to a refrigerant inlet side of an indoor condenser 12. The indoor condenser 12 is disposed within an air conditioning case 31 of an indoor air conditioning unit 30 of the air conditioner 1 for a vehicle to be described later. The indoor condenser 12 serves as a radiator for dissipating heat from the high-temperature and high-pressure refrigerant discharged from the compressor 11 (specifically, the high-pressure side compression mechanism). The indoor condenser 12 is a user-side heat exchanger (first user-side heat exchanger) for heating the feed air passing through an indoor evaporator 23 to be described later.

The refrigerant outlet side of the indoor condenser 12 is coupled to the inlet side of the high-pressure side expansion valve 13 serving as a high-pressure side decompressor (first decompressor) for decompressing the high-pressure refrigerant flowing from the indoor condenser 12 into the intermediate-pressure one. The high-pressure side expansion valve 13 is an electric variable throttle mechanism including a valve body having a variable throttle opening degree, and an electric actuator comprised of a stepping motor for changing the throttle opening degree of the valve body.

More specifically, the high-pressure expansion valve 13 changes the throttle opening degree such that the area of a throttle passage has an equivalent diameter in a range of $\phi 0.5$ to 3 mm when the valve is throttled to decompress the refrigerant. When the throttle opening is fully opened, the area of the throttle passage can be surely set to an equivalent diameter of $\phi 10$ mm not to exhibit a refrigerant decompression effect. The high-pressure side expansion valve 13 has its operation controlled by a control signal output from the air conditioning controller 40.

The outlet side of the high-pressure side expansion valve 13 is coupled to a refrigerant inflow port 14b of a gas-liquid separator 14 serving as a gas-liquid separating portion for separating an intermediate-pressure refrigerant flowing from an indoor condenser 12 and decompressed by the high-pressure side expansion valve 13, into liquid and gas phases. The gas-liquid separator 14 is of a centrifugal separation type that separates the refrigerant into gas and liquid phases by the action of the centrifugal force.

Figure 3A:
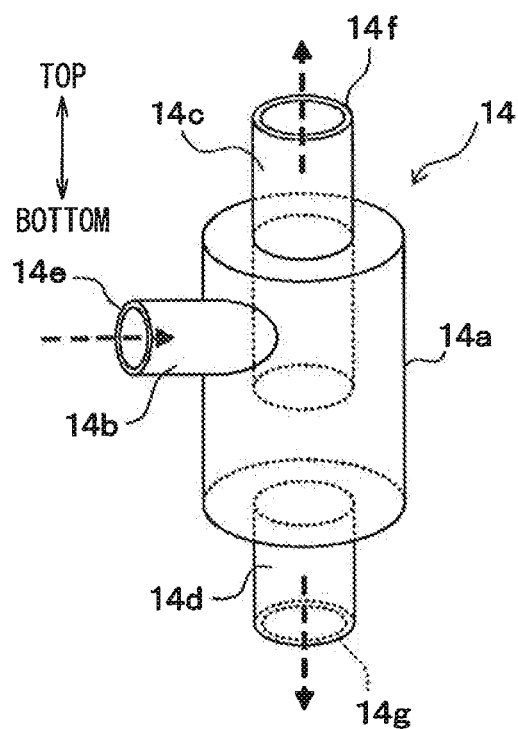
FIG. 3A is a perspective view of the appearance of a liquid/gas separator of the first embodiment.
Figure 3B:
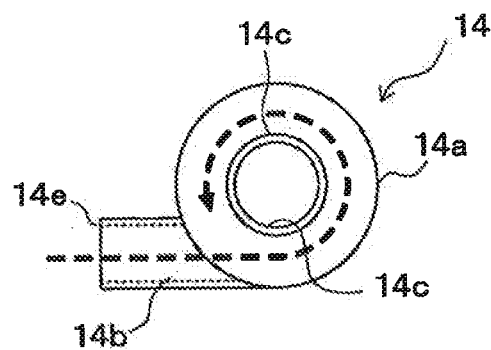
FIG. 3B is a top view of the liquid/gas separator of the first embodiment.

The detailed structure of the gas-liquid separator 14 will be described below using FIGS. 3A and 3B. FIG. 3A shows an exemplary perspective view of the appearance of the gas-liquid separator 14. FIG. 3B shows a top view of the gas-liquid separator 14 as viewed from the upper side. The respective upward and downward arrows in FIG. 3A indicate the respective upward and downward directions with the gas-liquid separator 14 mounted on the air conditioner 1 for a vehicle.

The gas-liquid separator 14 of this embodiment includes a main body 14a having a substantially hollow cylindrical shape (with a circular section) and extending vertically, and a refrigerant inflow port 14b having a refrigerant inlet 14e formed for allowing the intermediate-pressure refrigerant to flow thereinto. The gas-liquid separator 14 also includes a gas-phase refrigerant outflow port 14c having a gas-phase refrigerant outlet 14f formed for allowing the separated gas-phase refrigerant to flow therefrom, and a liquid-phase refrigerant outflow port 14d having a liquid-phase refrigerant outlet 14g formed for allowing the separated liquid-phase refrigerant to flow therefrom.

The diameter of the main body 14a is set to a value that is about 1.5 or more times larger, and about 3 or less times smaller than that of a refrigerant pipe coupled to the inflow and outflow ports 14b to 14d, which achieves the reduction in size of the entire gas-liquid separator 14.

More specifically, the volume of the gas-liquid separator 14 (specifically, main body 14a) of this embodiment is set smaller than that of an excessive refrigerant calculated by subtracting a necessary maximum refrigerant volume equivalent to an amount of a liquid-phase refrigerant required to exhibit the maximum capability of the cycle, from a charged refrigerant volume equivalent to an amount of a liquid-phase refrigerant charged into the cycle. Thus, the volume of the gas-liquid separator 14 in this embodiment becomes such a volume not to substantially store therein the excessive refrigerant even if the flow rate of the refrigerant circulating through the cycle is changed due to variations in load on the cycle.

The refrigerant inflow port 14b is coupled to a cylindrical side of the main body 14a, and is comprised of a refrigerant pipe extending in the tangential direction to the outer periphery of the circular section of the main body 14a when the gas-liquid separator 14 is viewed from the upper side as shown in FIG. 3B. The refrigerant inlet 14e is formed on the end of the refrigerant inflow port 14b opposite to the main portion 14a. The refrigerant inflow port 14b does not necessarily extend horizontally, and may extend with its vertical part.

The gas-phase refrigerant outflow port 14c is coupled to an upper end surface (upper surface) of the main body 14a in the axial direction, and is comprised of a refrigerant pipe extending coaxially with respect to the main portion 14a across the main portion 14a. The gas-phase refrigerant outlet 14f is formed on the upper end of the gas-phase refrigerant outflow port 14c. The lower end of the gas-phase refrigerant outflow port 14c is positioned under a coupling portion between the refrigerant inflow port 14b and the main portion 14a.

The liquid-phase refrigerant outflow port 14d is coupled to the lower end surface (bottom surface) of the main body 14a in the axial direction, and is comprised of a refrigerant pipe extending downward from the main portion 14a coaxially with respect to the main portion 14a. The liquid-phase refrigerant outlet 14g is formed on the lower end of the liquid-phase refrigerant outflow port 14d.

Thus, the refrigerant flowing into the refrigerant inlet 14e of the refrigerant inflow port 14b circles and flows along the cylindrical inner wall surface of the main portion 14a, and is separated into gas and liquid phases by the action of a centrifugal force generated by the circling flow. Further, the separated liquid-phase refrigerant drops toward the lower side of the main portion 14a by the action of the gravity.

Then, the separated liquid-phase refrigerant dropping downward flows from the liquid-phase refrigerant outlet 14g of the liquid-phase refrigerant outflow port 14d, and the separated gas-phase refrigerant flows from the gas-phase refrigerant outlet 14f of the gas-phase refrigerant outflow port 14c. As shown in FIG. 3, the lower end surface (bottom surface) of the main body 14a in the axial direction is formed in a disk shape, by way of example. Alternatively, the lower part of the main part 14a is formed in a tapered shape such that the lower part of the main body 14a may have its diameter gradually decreased downward, and the lowermost part of the tapered shape may be coupled to the liquid-phase refrigerant outflow port 14d.

Figure 1:
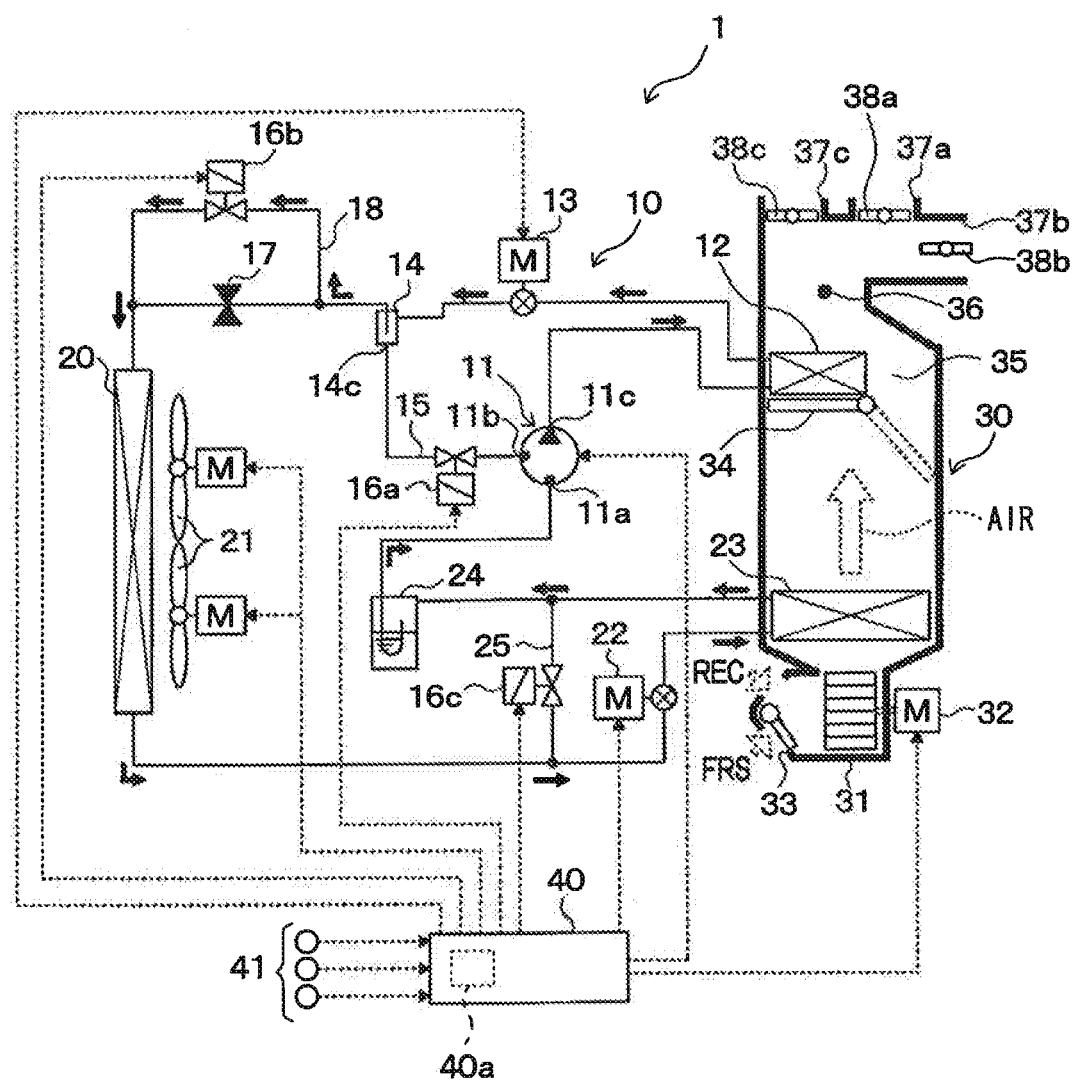
FIG. 1 is an entire configuration diagram showing refrigerant flow paths in a cooling operation mode of a heat pump cycle in a first embodiment.
Figure 2:
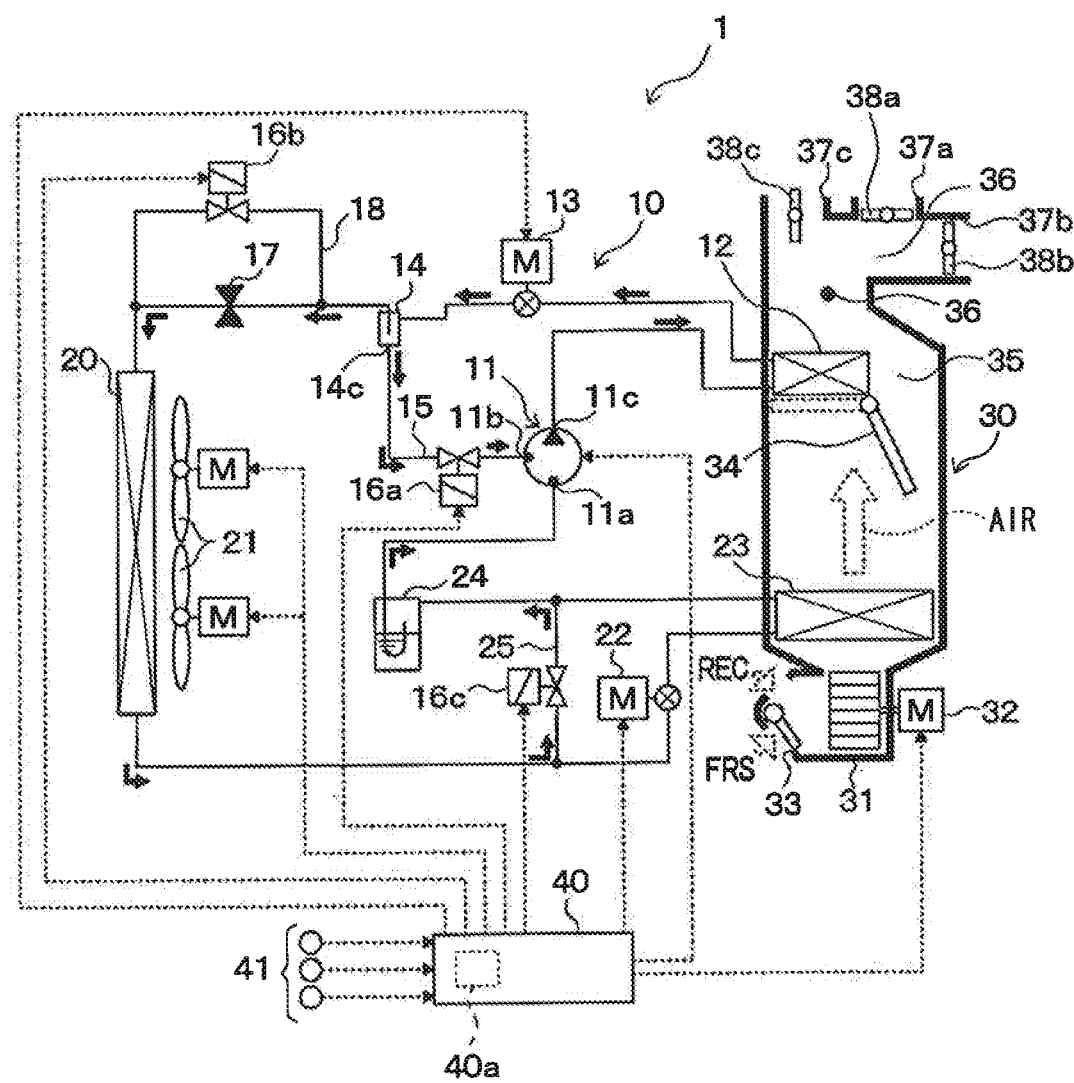
FIG. 2 is an entire configuration diagram showing refrigerant flow paths in a heating operation mode of the heat pump cycle in the first embodiment.

As shown in FIGS. 1 and 2, the gas-phase refrigerant outflow port 14c of the gas-liquid separator 14 is coupled to the intermediate-pressure port 11b of the compressor 11 via the intermediate-pressure refrigerant passage 15. An intermediate-pressure side opening/closing valve 16a is disposed in the intermediate-pressure refrigerant passage 15. The intermediate-pressure side opening/closing valve 16a is an electromagnetic valve for opening and closing the intermediate-pressure refrigerant passage 15, and has its operation controlled by a control signal output from the air conditioning controller 40.

The intermediate-pressure side opening/closing valve 16a also serves as a check valve for allowing the refrigerant to flow only from a gas-phase refrigerant outlet of the gas-liquid separator 14 to the intermediate-pressure port 11b of the compressor 11 upon opening the intermediate-pressure refrigerant passage 15. Thus, the refrigerant is prevented from flowing backward from the compressor 11 to the gas-liquid separator 14 when the intermediate-pressure opening/closing valve 16a opens the intermediate-pressure refrigerant passage 15.

The intermediate-pressure side opening/closing valve 16a serves to switch between cycle structures (refrigerant flow paths) by opening and closing the intermediate-pressure refrigerant passage 15. Thus, the intermediate-pressure side opening/closing valve 16a of this embodiment forms a refrigerant flow path switching portion for switching between the refrigerant flow paths of the refrigerant circulating through the cycle.

The liquid-phase refrigerant outlet port 14d of the gas/liquid separator 14 is coupled to the inlet side of the low-pressure side fixed throttle 17 as the low-pressure decompressor (second decompressing portion) for decompressing the liquid-phase refrigerant separated by the gas-liquid separator 14 into a low-pressure refrigerant. The outlet side of the low-pressure side fixed throttle 17 is coupled to the refrigerant inlet side of the outdoor heat exchanger 20. The low-pressure type fixed throttle 17 can use a nozzle or an orifice whose throttle opening is fixed.

The fixed throttle, such as a nozzle or an orifice, has its throttle passage area sharply shorten or enlarged, which can achieve the self-adjustment (balance) of the flow rate of refrigerant passing through the fixed throttle and the dryness of the refrigerant on the upstream side of the low-pressure side fixed throttle 17 according to a change in pressure between the upstream side and the downstream side of the throttle (that is, a change in pressure between the outlet and inlet thereof).

Specifically, when the difference in pressure becomes relatively large, the dryness of the refrigerant on the upstream side of the fixed throttle is balanced so as to be increased with decreasing necessary flow rate required for the refrigerant to circulate through the cycle. In contrast, when the difference in pressure becomes relatively small, the dryness of the refrigerant on the upstream side of the fixed throttle is balanced so as to be decreased with increasing necessary flow rate of the circulating refrigerant.

When the dryness of the refrigerant on the upstream side of the low-pressure side fixed throttle 17 becomes larger, the outdoor heat exchanger 20 serves as an evaporator that exhibits the heat absorption effect of the refrigerant. In this case, the amount of heat of the refrigerant (refrigeration capacity) absorbed by the outdoor heat exchanger 20 is decreased to make a coefficient of performance (COP) of the cycle worse.

In this embodiment, even when the necessary flow rate of the circulating refrigerant is changed due to variations in load on the cycle in the heating operation mode, this embodiment uses the low-pressure side fixed throttle 17 by which the dryness X of the refrigerant on the upstream side of the throttle 17 is equal to or less than 0.1, and thereby suppresses the deterioration of the COP. That is, the low-pressure side fixed throttle 17 of this embodiment adjusts the dryness X of the refrigerant on the upstream side of the low-pressure side fixed throttle 17 to 0.1 or less even if the flow rate of the circulating refrigerant and the different in pressure between the inlet and outlet of the low-pressure side fixed throttle 17 are possibly changed in such a degree as to cause variations in load on the heat pump cycle 10.

The liquid-phase refrigerant outflow port 14d of the gas-liquid separator 14 is coupled to a passage 18 for bypass of the fixed throttle that allows the liquid-phase refrigerant separated by the gas-liquid separator 14 to bypass the low-pressure side fixed throttle 17 into the outdoor heat exchanger 20. In the fixed throttle bypass passage 18, a low-pressure side opening/closing valve 16b is provided for opening and closing the fixed throttle bypass passage 18. The basic structure of the low-pressure side opening/closing valve 16b is substantially the same as that of the intermediate-pressure side opening/closing valve 16a. The valve 16b is an electromagnetic valve whose opening and closing operation is controlled by a control voltage output from the air conditioning controller 40.

The loss in pressure caused when the refrigerant passes through the low-pressure side opening/closing valve 16b is very small as compared to that caused when the refrigerant passes through the low-pressure side fixed throttle 17. Thus, when the low-pressure side opening/closing valve 16b is opened, the refrigerant flowing from the indoor condenser 12 flows into the outdoor heat exchanger 20 via the fixed throttle bypass passage 18, whereas, when the valve 16b is closed, the refrigerant flows into the heat exchanger 20 via the low-pressure side fixed throttle 17.

Thus, the low-pressure side opening/closing valve 16b can switch between the refrigerant flow paths of the heat pump cycle 10. Thus, the low-pressure side opening/closing valve 16b of this embodiment serves as the refrigerant flow path switching portion together with the above intermediate-pressure side opening/closing valve 16a.

Such a refrigerant flow path switching portion may employ an electric three-way valve or the like that can switch between a refrigerant circuit for coupling the outlet side of the liquid-phase refrigerant outflow port 14d of the gas-liquid separator 14 to the inlet side of the low-pressure side fixed throttle 17, and another refrigerant circuit for coupling the outlet side of the liquid-phase refrigerant outflow port 14d to the inlet side of the fixed throttle bypass passage 18.

The outdoor heat exchanger 20 is disposed in the bonnet to exchange heat between the refrigerant flowing therethrough and the outside air blown from the blower fan 21. The outdoor heat exchanger 20 is a heat exchanger that serves as an evaporator for evaporating the low-pressure refrigerant to exhibit the heat absorption effect in at least the heating operation mode, and which serves as a radiator for dissipating heat from the high-pressure refrigerant in the cooling operation mode.

The refrigerant outlet side of the outdoor heat exchanger 20 is coupled to the refrigerant inlet side of the expansion valve 22 for cooling as a third decompressor. The expansion valve 22 for cooling is to decompress the refrigerant flowing from the outdoor heat exchanger 20 into the indoor evaporator 23 in the cooling operation mode or the like. The basic structure of the expansion valve 22 for cooling is the same as that of the high-pressure side expansion valve 13, and has its operation controlled by the control signal output from the air conditioning controller 40.

The outlet side of the expansion valve 22 for cooling is coupled to the refrigerant inlet side of the indoor evaporator 23. The indoor evaporator 23 is disposed on the upstream side of the feed air flow in the indoor condenser 12 within the air conditioning case 31 of the indoor air conditioning unit 30. The evaporator 23 is an evaporator (second user-side heat exchanger) for cooling the feed air by evaporating the refrigerant flowing therethrough to exhibit the heat absorption effect in the cooling operation mode, in the dehumidification and heating operation mode, and the like.

The outlet side of the indoor evaporator 23 is coupled to the inlet side of the accumulator 24. The accumulator 24 is a low-pressure side gas-liquid separator that separates the refrigerant flowing thereinto into gas and liquid phases to store the excessive refrigerant. The outlet for the gas-phase refrigerant of the accumulator 24 is coupled to the suction port 11a of the compressor 11. Thus, the indoor evaporator 23 is coupled to allow the refrigerant to flow toward the suction port 11a of the compressor 11.

The refrigerant outlet side of the outdoor heat exchanger 20 is coupled to an expansion valve bypass passage 25 for allowing the refrigerant flowing from the outdoor heat exchanger 20 to bypass the expansion valve 22 for cooling and the indoor evaporator 23 and to be guided into the inlet side of the accumulator 24. In the expansion valve bypass passage 25, an opening/closing valve 16c for cooling is provided for opening and closing the expansion valve bypass passage 25.

The basic structure of the opening/closing valve 16c for cooling is the same as that of the low-pressure side opening/closing valve 16b, and has its opening and closing operation controlled by a control voltage output from the air conditioning controller 40. The loss in pressure caused when the refrigerant flows through the opening/closing valve 16c for cooling is very small as compared to that caused in when the refrigerant flows through the expansion valve 22 for cooling.

In the opened state of the opening/closing valve 16c for cooling, the refrigerant flowing from the outdoor heat exchanger 20 flows into the accumulator 24 via the expansion valve bypass passage 25. At this time, the throttle opening degree of the expansion valve 22 for cooling may be completely closed.

In the closed state of the opening/closing valve 16c for cooling, the refrigerant flows into the indoor heat evaporator 23 via the expansion valve 22 for cooling. Thus, the opening/closing valve 16c for cooing can switch between refrigerant flow paths of the heat pump cycle 10. Thus, the opening/closing valve 16c for cooling of this embodiment forms the refrigerant flow path switching portion together with the intermediate-pressure side opening/closing valve 16a and the low-pressure side opening/closing valve 16b.

Now, the indoor air conditioning unit 30 will be described below. The indoor air conditioning unit 30 is disposed inside a gauge board (instrumental panel) at the foremost part of the vehicle interior to form an outer envelope of the indoor air conditioning unit 30. The indoor air conditioning unit 30 includes therein an air conditioning case 31 forming an air passage for the feed air blown into the vehicle interior. The air passage accommodates therein the blower 32, the above indoor condenser 12, and the indoor evaporator 23.

An inside/outside air switching device 33 for switching between the vehicle indoor air (inside air) and the vehicle outdoor air (outside air) and introducing the selected air is disposed on the most upstream side of the air flow in the air conditioning case 31. The inside/outside air switching device 33 is an inside/outside air adjustment portion for continuously changing the rate of the volume of the inside air to that of the outside air by continuously adjusting the opening areas of an inside air inlet for introducing the inside air into the air conditioning case 31 and an outside air inlet for introducing the outside air thereinto, using the inside/outside air switching door.

The blower 32 for blowing the air sucked via the inside/outside air switch 33, into the vehicle interior is disposed on the downstream side of the air flow of the inside/outside air switch 33. The blower 32 is an electric blower which includes a centrifugal multiblade fan (sirocco fan) driven by an electric motor, and whose number of revolutions (volume of feed air) is controlled by a control voltage output from the air conditioning controller 40.

The above indoor evaporator 23 and the indoor condenser 12 are disposed on the downstream side of the air flow from the blower 32 in that order with respect to the flow of the feed air. In short, the indoor evaporator 23 is disposed on the upstream side of the air flow with respect to the indoor condenser 12.

A bypass passage 35 is provided in the air conditioning case 31, for allowing the feed air passing through the indoor evaporator 23 to bypass and flow through the indoor condenser 12. An air mix door 34 is disposed on the downstream side of the air flow of the indoor evaporator 23 and on the upstream side of the air flow of the indoor condenser 12.

The air mix door 34 of this embodiment is a flow rate adjustment portion for adjusting the flow rate (volume) of the feed air to flow into the indoor condenser 12 by adjusting the rate of the volume of the feed air passing through the indoor condenser 12 to that of the air passing through the bypass passage 35 among the feed air passing through the indoor evaporator 23.

A mixing space 36 for mixing the feed air heated by heat exchange with the refrigerant in the indoor condenser 12, with the feed air not heated and having passed through the bypass passage 35 is provided on the downstream side of the air flow of the indoor condenser 12 and the bypass passage 35.

Openings for blowing the feed air mixed in the mixing space 36 into the vehicle interior as a space of interest to be cooled are disposed on the most downstream side of the air flow of the air conditioning case 31. Specifically, the openings include a defroster opening 37a for blowing the conditioned air toward the inner side of a front windowpane of the vehicle, a face opening 37b for blowing the conditioned air toward the upper half body of a passenger in the vehicle interior, and a foot opening 37c for blowing the conditioned air toward the foot of the passenger.

Thus, the air mix door 34 adjusts the rate of the volume of air passing through the indoor condenser 12 to that of air passing through the bypass passage 35 to thereby adjust the temperature of the feed air within the mixing space 36. The air mix door 34 is driven by a servo motor (not shown) whose operation is controlled by a control signal output from the air conditioning controller 40.

A defroster door 38a for adjusting the opening area of the defroster opening 37a, a face door 38b for adjusting the opening area of the face opening 37b, and a foot door 38c for adjusting the opening area of the foot opening 37c are provided on the upstream side of the air flow of the defroster opening 37a, the face opening 37b, and the foot opening 37c, respectively.

The defroster door 38a, the face door 38b, and the foot door 38c open and close the respective openings 37a to 37c to thereby form an air outlet mode switching portion for switching among air outlet modes. These doors are driven by a servo motor (not shown) whose operation is controlled by a control signal output from the air conditioning controller 40 via a link mechanism or the like.

The downstream sides of the air flow of the defroster opening 37a, the face opening 37b, and the foot opening 37c are coupled to a face air outlet, a foot air outlet, and a defroster air outlet provided in the vehicle interior via ducts forming respective air passages.

The air outlet modes include a face mode for blowing air toward the upper half body of the passenger in the vehicle interior from the face air outlet by fully opening the face opening 37b, a bi-level mode for blowing air toward the upper half body and the foot of the passenger in the vehicle interior by opening both the face opening 37b and the foot opening 37c, and a foot mode for blowing air mainly from the foot air outlet by fully opening the foot opening 37c, while slightly opening the defroster opening 37a.

Now, an electric controller of this embodiment will be described below. The air conditioning controller 40 is comprised of the well-known microcomputer including a CPU, a ROM, and a RAM, and a peripheral circuit thereof. The air conditioning controller 40 performs various types of computations and processes based on the air conditioning control programs stored in the ROM to thereby control the operation of each of the air conditioning control devices (compressor 11, refrigerant flow path switching portions 16a to 16c, blower 32, and the like) coupled to the output side thereof.

The input side of the air conditioning controller 40 is coupled to a group of various sensors 41 for air conditioning control. The sensors include an inside air sensor for detecting a temperature of the vehicle interior, an outside air sensor for detecting a temperature of the outside air, a solar radiation sensor for detecting an amount of solar radiation in the vehicle interior, and an evaporator temperature sensor for detecting a temperature Te of outflow air flowing from the indoor evaporator 23 (evaporator temperature). And, the sensors also include a discharge pressure sensor for detecting the pressure of a high-pressure refrigerant discharged from the compressor 11, a condenser temperature sensor for detecting the temperature of the refrigerant flowing from the indoor condenser 12, and a suction pressure sensor for detecting a suction refrigerant pressure of the refrigerant sucked into the compressor 11.

An operation panel (not shown) disposed near the gauge board at the front part of the vehicle interior is coupled to the input side of the air conditioning controller 40. Operation signals are input from various types of air conditioning operating switches provided on the operation panel. Various types of air conditioning operating switches provided on the operation panel include an operating switch for the vehicle air conditioner 1, a vehicle interior temperature setting switch for setting the temperature of the vehicle interior, and a mode selection switch for selecting one of the cooling operation mode, the dehumidification and heating operation mode, and the heating operation mode.

The air conditioning controller 40 includes the integration of control units for controlling the operations of the respective air conditioning control devices coupled to the output side of the controller 40. The structure for controlling the operations of the respective control devices of interest (hardware and software) forms the control units for controlling the operations of the respective control devices.

For example, in this embodiment, the structure for controlling the operation of the electric motor of the compressor 11 forms a discharge capacity control unit, and the structure for controlling the operation of the refrigerant flow path switching portions 16a to 16c forms a refrigerant flow path control unit. The structure for controlling the servo motor for the air mix door 34, that is, the structure for controlling the operation of the air mix door 34 forms an air mix door controller 40a. The discharge capacity control unit, the refrigerant flow path control unit, and the air mix door controller 40a may be formed as other controllers with respect to the air conditioning controller 40.

Figure 4:
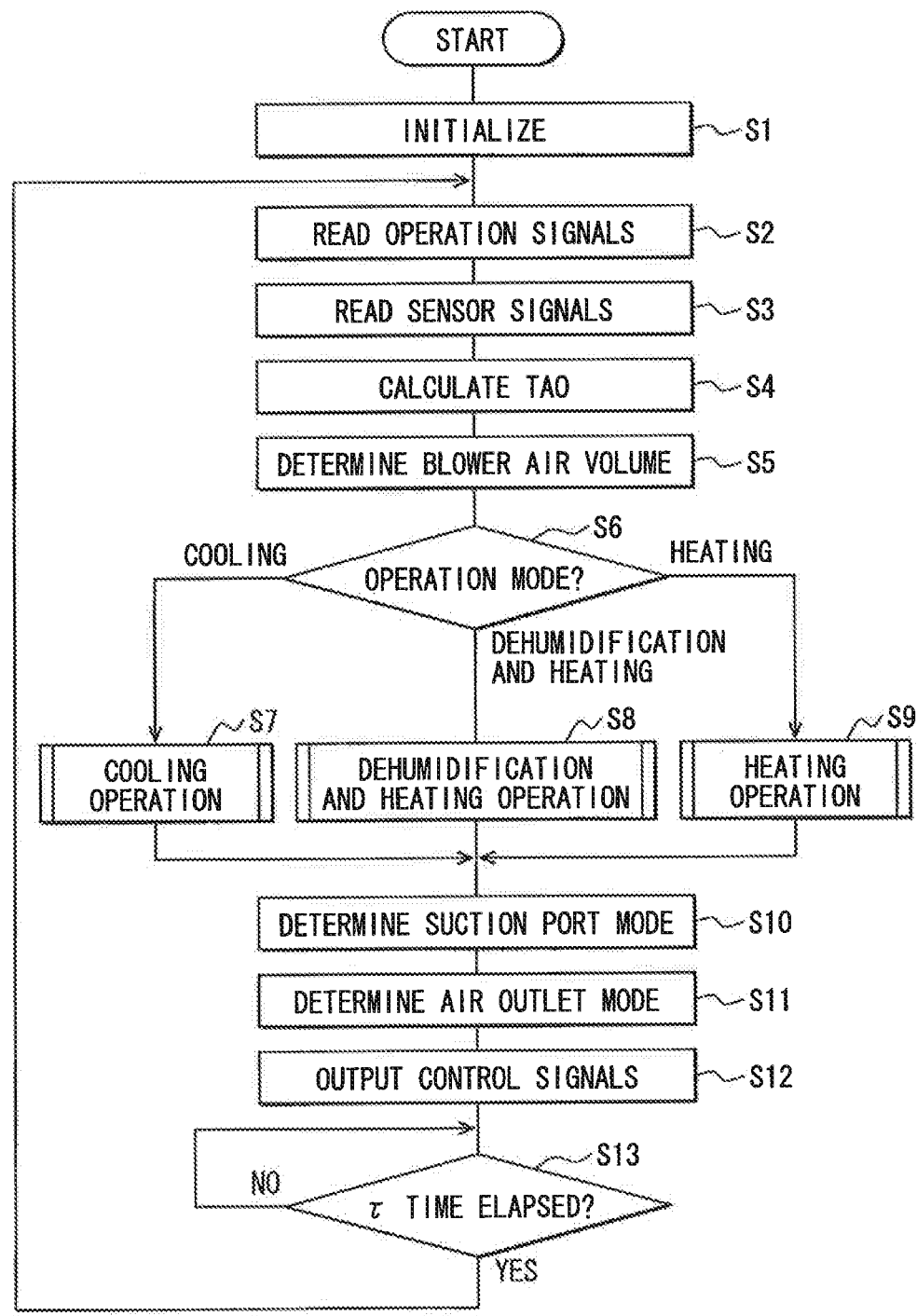
FIG. 4 is a flowchart showing a control process of an air conditioner for a vehicle in the first embodiment.

Next, the operation of the air conditioner 1 for a vehicle of this embodiment with the above structure will be described below using FIGS. 4 to 15. FIG. 4 shows a flowchart of the control process as a main routine of the air conditioner 1 for a vehicle of this embodiment. When the operation switch of the air conditioner 1 for the vehicle is turned on (ON), the control process is started. The respective control steps in the flow charts of the respective drawings form various function achieving portions included in the air conditioning controller 40.

First, in step S1, a flag, a timer, or the like is initialized, and the positioning of the above various types of electric actuators or the like is initialized (subjected to initialization). Then, the operation proceeds to step S2. In the initialization process at step S1, some values stored at the time of completing the previous operation of the air conditioner 1 for a vehicle among flags and computation values are kept.

In step S2, an operation signal of the operation panel, such as a preset temperature Tset of the vehicle interior set by a vehicle interior temperature setting switch, or an operation mode selected by a mode selection switch, is read, and then the operation proceeds to step S3. In step S3, a signal indicative of a vehicle environmental state used for control of air conditioning, that is, a detection signal from the group of sensors 41 for the air conditioning control described above is read, and then the operation proceeds to step S4.

In step S4, a target outlet air temperature (target temperature) TAO of feed air blown from each air outlet into the vehicle interior is calculated, and then the operation proceeds to step S5. Specifically, in step S4 of this embodiment, the target outlet air temperature TAO is calculated using a vehicle interior preset temperature Tset, a vehicle interior temperature (inside air temperature) Tr detected by the inside air sensor, an outside air temperature Tam detected by the outside air sensor, and a solar radiation amount Ts detected by a solar radiation sensor.

In step S5, a blowing capacity (volume of feed air) of the blower 32 is determined, and then the operation proceeds to step S6. Specifically, in step S5, a volume of air from the blower 32 (specifically, a blower motor voltage to be applied to the electric motor) is determined with reference to a control map pre-stored in the air-conditioning controller 40 based on the target outlet air temperature TAO determined in step S4.

More specifically, in this embodiment, the blower motor voltage is set to a high voltage near the maximum value in an ultra-low temperature range of the TAO, and in an ultra-high temperature range thereof, so that the volume of air from the blower 32 is controlled to about the maximum air volume. When the TAO is increased from the ultra-low temperature range to an intermediate temperature range, the blower motor voltage is decreased with increasing TAO to thereby decrease the volume of air from the blower 32.

When the TAO is decreased from the ultra-high temperature range to the intermediate temperature range, the blower motor voltage is decreased with decreasing TAO to thereby decrease the volume of air from the blower 32. When the TAO enters a predetermined intermediate temperature range, the blower motor voltage is minimized to thereby minimize the volume of air from the blower 32.

In step S6, an operation mode is determined based on an operation signal of the mode selection switch on the operation panel. When the cooling operation mode is selected by the mode selection switch, the operation proceeds to step S7. When the dehumidification and heating operation mode is selected, the operation proceeds to step S8. When the heating operation mode is selected, the operation proceeds to step S9. Thus, the control process in each operation mode is performed.

When the control process according to each operation mode is performed in each of steps S7 to S9, the operation proceeds to step S10. The detailed contents of the control processes in steps S7 to S9 will be described below.

In step S10, a suction port mode (air inlet mode), that is, the switching state of the inside/outside air switching device 33 is determined, and then the operation proceeds to step S11. In step S10, the suction port mode is determined based on the TAO with reference to a control map pre-stored in the air conditioning controller 40. In this embodiment, basically, an outside air mode for introducing the outside air is given higher priority. When the TAO is located in the ultra-low temperature range, and a high cooling performance is required, an inside air mode for introducing the inside air is selected.

In step S11, the air outlet mode is determined, and then the operation proceeds in step S12. In step S11, the air outlet mode is determined based on the TAO with reference to a control map pre-stored in the air conditioning controller 40. In this embodiment, when the TAO is decreased from the high-temperature range to the low-temperature range, the air outlet mode is switched from the foot mode to the bi-level mode, and then to the face mode in that order.

In step S12, the control signals and the control voltages are determined and output to various control devices of interest coupled to the output side from the air conditioning device 40 so as to obtain the control state determined in the above steps S6 to S11. In subsequent step S13, the operation waits during a control cycle τ. When the control cycle τ is determined to have elapsed, the operation returns to step S2.

As mentioned above, the main routine shown in FIG. 4 involves reading a detection signal and an operation signal, determining the control state of each control device of interest, and outputting the control signals and the control voltages to the respective control devices of interest. The main routine is repeated until the operation of the vehicle air conditioner 1 is required to be stopped (for example, until the operating switch is turned off). Next, the details of the respective operation modes performed in steps S7 to S9 will be described below.

(a) Cooling Operation Mode

The cooling operation mode performed in step S7 will be described below in detail. In the cooling operation mode, the air conditioning controller 40 fully opens the high-pressure side expansion valve 13, throttles the expansion valve 22 for cooling so as to exhibit the decompression effect, closes the intermediate-pressure side opening/closing valve 16a, opens the low-pressure side opening/closing valve 16b, and closes the opening/closing valve 16c for cooling.

Thus, in step S12 shown in FIG. 4, when the control signal or control voltage is output to the respective control devices of interest, the heat pump cycle 10 performs switching to a refrigerant flow path through which the refrigerant flows as indicated by a solid arrow of FIG. 1. The refrigerant flow path structure determines the operating state of various air conditioning control devices coupled to the output side of the air conditioning controller 40 based on the detection signals from the group of sensors and the target outlet air temperature TAO calculated in the control step S4.

For example, the number of revolutions Nc of the compressor 11 (that is, the control signal to be output to the electric motor of the compressor 11) is determined as follows. First, a target evaporator blown air temperature TEO of the indoor evaporator 23 is determined based on the target outlet air temperature TAO with reference to a control map pre-stored in the air conditioning controller 40. In order to prevent the frost formation of the indoor evaporator 23, the target evaporator outlet air temperature TEO is determined to be equal to or more than a predetermined temperature (for example, 1° C. in this embodiment) which is higher than a frost formation temperature (0° C.).

The number of revolutions Nc of the compressor 11 is determined based on a deviation between the target evaporator outlet air temperature TEO and an outflow air temperature Te of the air from the indoor evaporator 23 detected by the evaporator temperature sensor by a feedback control method such that the outflow air temperature Te of the air from the indoor evaporator 23 approaches the target evaporator outlet air temperature TEO.

The control signal output to the expansion valve 22 for cooling is determined such that the supercool degree of the refrigerant flowing into the expansion valve 22 for cooling approaches the predetermined target supercool degree so as to substantially maximize the COP.

The control signal output to the servo motor of the air mix door 34 is determined as follows. A target opening degree SWd (%) serving as a target value of the rate of the volume of the air passing through the indoor condenser 12 to that of the air passing through the bypass passage 35 (air mix opening degree SW) is calculated by the following formula F1 from the target outlet air temperature TAO, the outflow air temperature Te of the air from the indoor evaporator 23, and the refrigerant temperature Th in the indoor condenser 12.

$$SWd=[TAO-(Te+\alpha)]/[Th-(Te+\alpha)] \quad \text{F1}$$

in which α in the formula F1 indicates a correction coefficient. The refrigerant temperature Th in the indoor condenser 12 can be calculated based on detection values from a discharge pressure sensor and a condenser temperature sensor. Alternatively, a temperature sensor may be provided for detecting the temperature of a fin of the indoor condenser 12 to set a detection value of the temperature sensor as a refrigerant temperature Th.

The target opening degree SWd indicated by the formula F1 is 100% in the maximum heating state of allowing all volume of the feed air passing through the indoor evaporator 23 to pass through the indoor condenser 12. In contrast, the target opening degree SWd is 0% in the maximum cooling state of allowing all volume of the feed air passing through the indoor evaporator 23 to pass through the bypass passage 35.

Subsequently, the control signal to be output to the servo motor of the air mix door 34 is determined such that the rate of the volume of the air passing through the indoor condenser 12 to that of the air passing through the bypass passage 35 is the target opening degree SWd (%), by using the feedback control method (control (P control) in this example) as indicated by the following formula F2.

$$u(t)=u(t-1)+K(SWd-SW) \quad \text{F2}$$

in which u(t) of the formula F2 is a present control signal, u(t−1) is a previous control signal, K is a feedback gain, SW is a present air mix opening degree (A/M opening degree), and SWd is a target opening degree of the air mix opening degree SW. In this embodiment, the feed back gain K is kept constant regardless of the operation mode of the heat pump cycle 10.

Specifically, in the cooling operation mode, the target outlet air temperature TAO becomes smaller, so that the target opening degree SWd of the air mix opening degree SW is determined to a value close to the minimum opening (0%). Thus, the control signal to be output to the servo motor of the air mix door 34 is determined such that the air mix door 34 closes an air passage of the indoor condenser 12 to allow all volume of feed air passing through the indoor evaporator 23 to pass through the bypass passage 35.

Then, the control signals and the like determined as described above are output to the respective various air conditioning control devices. Thereafter, in step S6 shown in FIG. 4, a control routine is repeatedly performed in each predetermined control cycle until the operation mode is switched to the dehumidification and heating operation mode or the heating operation mode, or until the operation of the air conditioner for a vehicle is required to be stopped by an operation signal or the like from the operation panel. The control routine involves reading the above detection signal and operation signal, calculating the target outlet air temperature TAO, determining the operation state of the respective air conditioning control devices, and outputting the control voltage and the control signal.

Figure 5:
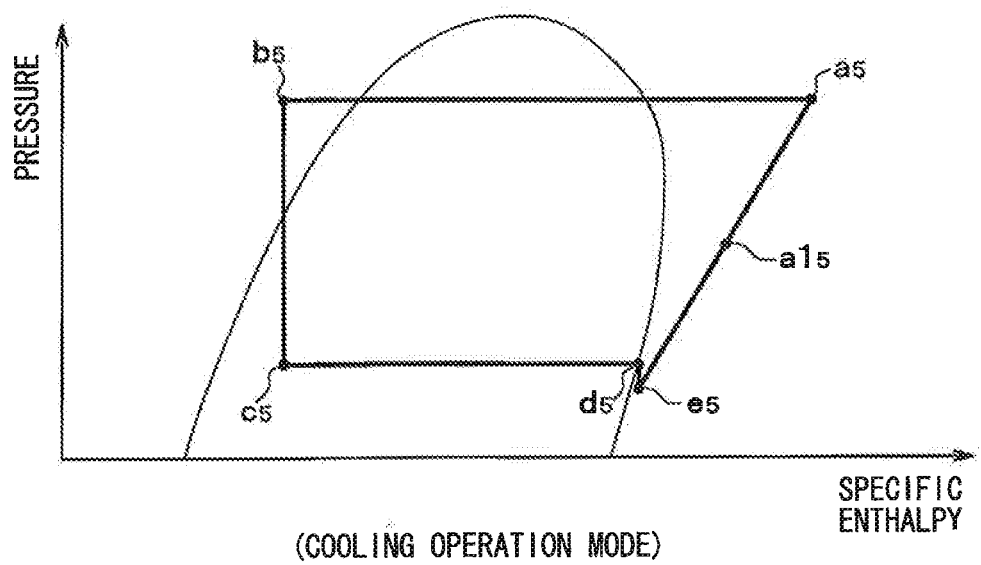
FIG. 5 is a Mollier chart showing the state of the refrigerant in the cooling operation mode of the heat pump cycle in the first embodiment.

Thus, in the heat pump cycle 10 of the cooling operation mode, as shown in the Mollier chart of FIG. 5, the high-pressure refrigerant (as indicated by a point $a_5$ in FIG. 5) discharged from the discharge port 11c of the compressor 11 flows into the indoor condenser 12. At this time, the air mix door 34 closes the air passage of the indoor condenser 12, so that the refrigerant flowing into the indoor condenser 12 flows from the indoor condenser 12 without substantially dissipating heat into the feed air.

The refrigerant flowing from the indoor condenser 12 flows into the outdoor heat exchanger 20 via the high-pressure side expansion valve 13, the gas-liquid separator 14, and the low-pressure side opening/closing valve 16b in that order. More specifically, the refrigerant flowing from the indoor condenser 12 flows out without being substantially decompressed by the high-pressure side expansion valve 13 since the high-pressure side expansion valve 13 is fully opened, and then flows from the refrigerant inflow port 14b of the gas-liquid separator 14 into the gas-liquid separator 14.

In the indoor condenser 12, the refrigerant hardly dissipates heat into the feed air, so that the refrigerant to flow into the gas-liquid separator 14 is in a gas phase. Thus, the refrigerant is not separated into the gas and liquid phases by the gas-liquid separator 14, and the gas-phase refrigerant flows from the liquid-phase refrigerant outflow port 14d. Since the intermediate-pressure side opening/closing valve 16a is brought into a valve closed state, the gas-phase refrigerant never flows from the gas-phase refrigerant outflow port 14c.

Because the low-pressure opening/closing vale 16b is opened, the gas-phase refrigerant flowing from the liquid-phase refrigerant outflow port 14d flows into the outdoor heat exchanger 20 via a passage 18 for a fixed throttle bypass without flowing into the low-pressure side fixed throttle 17. The low-pressure refrigerant flowing into the outdoor heat exchanger 20 exchanges heat with the outside air blown from the blower fan 21 to dissipate heat therefrom (as indicated by the point $a_5$ to a point $b_5$ in FIG. 5).

Because the opening/closing valve 16c for cooling is in a closed state, the refrigerant flowing from the outdoor heat exchanger 20 is decompressed and expanded in an isenthalpic manner (as indicated by the point $b_5$ to a point $c_5$ in FIG. 5) until the refrigerant flows into the throttled expansion valve 22 for cooling to be converted into a low-pressure refrigerant. The low-pressure refrigerant decompressed by the expansion valve 22 for cooling flows into the indoor evaporator 23, and absorbs heat from the feed air blown from the blower 32 to evaporate itself (as indicated by the point c to a point d in FIG. 5). Thus, the feed air is cooled.

The refrigerant flowing from the indoor evaporator 23 flows into the accumulator 24 to be separated into gas and liquid phases. Then, the gas-phase refrigerant is sucked into the suction port 11a (a point $e_5$ in FIG. 5) to be compressed again by the low-pressure side compression mechanism and the high-pressure side compression mechanism, in that order (from the point $e_5$, to the point $a_{15}$, and to the point $a_5$ in FIG. 5).

In FIG. 5, the reason why the point $d_5$ is located in a different position from the point $e_5$ is that the gas-phase refrigerant flowing through the refrigerant pipe from the accumulator 24 to the suction port 11a of the compression mechanism 11 has the loss in pressure. Thus, in an ideal cycle, the point $d_5$ is desirably located in the same position as the point $e_5$. The same goes for the following Mollier chart.

As mentioned above, in the cooling operation mode, the air mix door 34 closes the air passage of the indoor condenser 12, so that the feed air cooled by the indoor evaporator 23 can be blown into the vehicle interior. Thus, the cooling of the vehicle interior can be achieved.

As can be seen from the above description, in the cooling operation mode (cooling operation mode), the refrigerant flowing from the indoor condenser 12 as the first user-side heat exchanger flows through the outdoor heat exchanger 20, the expansion valve 22 for cooling as the third decompressor, the indoor evaporator 23 as the second user-side heat exchanger, and the accumulator 24 in that order via the high-pressure side expansion valve 13 as the first decompressor and the gas-liquid separator 14.

(b) Dehumidification and Heating Operation Mode

Next, the dehumidification and heating operation mode performed in step S8 will be described below. In the dehumidification and heating operation mode, the high-pressure side expansion valve 13 is fully opened or throttled back, the expansion valve 22 for cooling is fully opened or throttled back, the intermediate-pressure side opening/closing valve 16a is closed, the low-pressure side opening/closing valve 16b is opened, and the opening/closing valve 16c for cooling is closed. Thus, the heat pump cycle 10 is switched to the refrigerant flow path for allowing the refrigerant to flow therethrough as indicated by a solid arrow in FIG. 1, like the cooling operation mode.

The number of revolutions Nc of the compressor 11 is determined such that the high-pressure side refrigerant pressure Pd of the refrigerant in the heat pump cycle 10 flowing from the discharge port 11c of the compressor 11 into the inlet side of the high-pressure side expansion valve 13 approaches the target high pressure TPd by the feedback control method or the like. The target high pressure Td is determined based on the target outlet air temperature TAO with reference to a control map pre-stored in the air conditioning controller 40 such that the feed air blown into the vehicle interior becomes the target outlet air temperature TAO.

In the dehumidification and heating operation mode, the refrigerant temperature Th in the indoor condenser 12 is controlled to basically approach the target outlet air temperature TAO, whereby the target opening degree SWd of the air mix opening degree SW is determined to be a maximum opening degree (100%). Thus, the control signal to be output to the servo motor of the air mix door 34 is determined such that the air mix door 34 closes the bypass passage 35 so as to allow all volume of feed air passing through the indoor evaporator 23 to pass through the indoor condenser 12.

In the dehumidification and heating mode of this embodiment, the throttle opening degree of the high-pressure side expansion valve 13 and the expansion valve 22 for cooling are changed according to a difference in temperature between the preset temperature and the outside air temperature. Specifically, the dehumidification and heating mode is performed in four stages of the first dehumidification and heating mode to the fourth dehumidification and heating mode with increasing target outlet air expansion valve TAO.

(b)-1: First Dehumidification and Heating Mode

In the first dehumidification and heating mode, the high-pressure side expansion valve 13 is fully opened, and the expansion valve 22 for cooling is throttled. Thus, the cycle structure (refrigerant flow path) is completely the same as that in the cooling operation mode. However, the air mix door 34 has a maximum opening degree (100%) for fully opening the air passage of the indoor condenser 12, whereby the state of the refrigerant circulating through the cycle is changed as indicated by the Mollier chart of FIG. 6.

Figure 6:
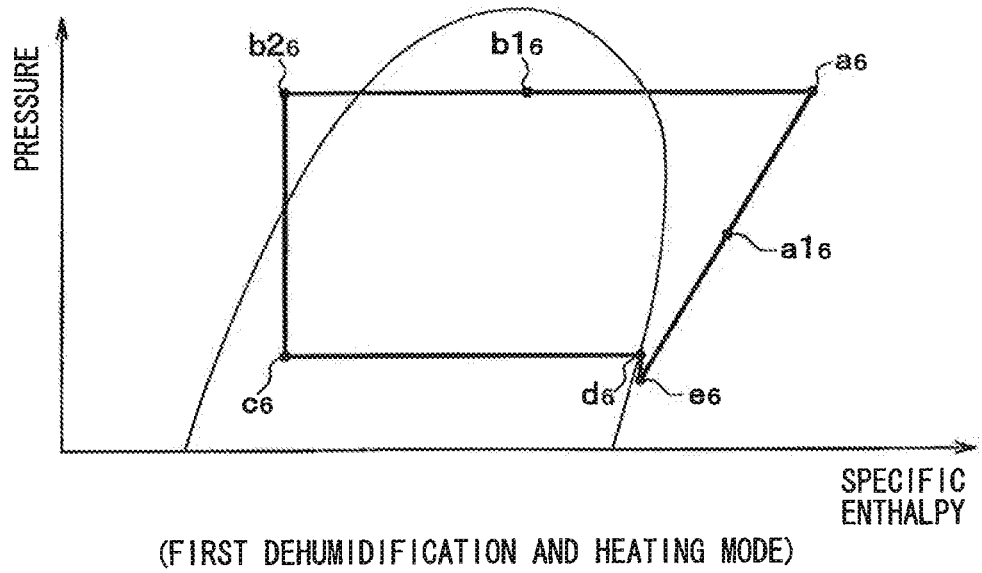
FIG. 6 is a Mollier chart showing the state of the refrigerant in a first dehumidification and heating operation mode of the heat pump cycle in the first embodiment.

That is, as shown in FIG. 6, the high-pressure refrigerant discharged from the discharge port 11c of the compressor 11 (as indicated by a point $a_6$ in FIG. 6) flows into the indoor condenser 12, and exchanges heat with the feed air cooled and dehumidified by the indoor evaporator 23 to dissipate heat therefrom (from the point $a_6$ to a point $b1_6$ in FIG. 6). Thus, the feed air is heated.

The refrigerant flowing from the indoor condenser 12 flows into the outdoor heat exchanger 20 through the high-pressure side expansion valve 13, the gas-liquid separator 14, and the low-pressure side opening/closing valve 16b in that order, like in the cooling operation mode. The low-pressure refrigerant flowing into the outdoor heat exchanger 20 exchanges heat with the outside air blown from the blower fan 21 to dissipate heat therefrom (from the point $b1_6$ to a point $b2_6$ in FIG. 6). The following operation is the same as that in the cooling operation mode.

As mentioned above, in the first dehumidification and heating mode, the feed air cooled and dehumidified by the indoor evaporator 23 can be heated and blown into the vehicle interior by the indoor condenser 12. Thus, the dehumidification and heating of the vehicle interior can be achieved.

(b)-2: Second Dehumidification and Heating Mode

Next, when the target outlet air temperature TAO is higher than a predetermined first reference temperature during the first dehumidification and heating mode, a second dehumidification and heating mode is performed. In the second dehumidification and heating mode, the high-pressure side expansion valve 13 is throttled, and the expansion valve 22 for cooling is throttled in such a degree that the throttle opening degree of the expansion valve 22 is increased more than the first dehumidification and heating mode. Thus, in the second dehumidification and heating mode, the state of the refrigerant circulating through the cycle is changed as indicated by the Mollier chart of FIG. 7.

Figure 7:
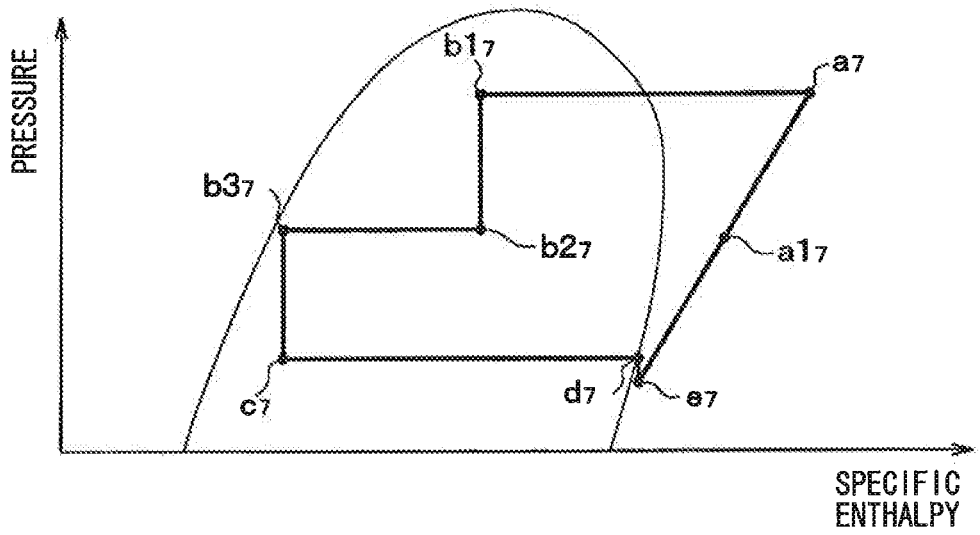
FIG. 7 is a Mollier chart showing the state of the refrigerant in a second dehumidification and heating operation mode of the heat pump cycle in the first embodiment.

That is, as shown in FIG. 7, the high-pressure refrigerant discharged from the discharge port 11c of the compressor 11 (as indicated by a point $a_7$ in FIG. 7) flows into the indoor condenser 12, and exchanges heat with the feed air cooled and dehumidified by the indoor evaporator 23 to dissipate the heat therefrom (as indicated by the point $a_7$ to a point $b1_7$ shown in FIG. 7). Thus, the feed air is heated.

The refrigerant flowing from the indoor condenser 12 is decompressed in an isenthalpic manner until it becomes the intermediate-pressure refrigerant through the high-pressure side expansion valve 13 being throttled (as indicated by the point $b1_7$ to a point $b2_7$ in FIG. 7). The intermediate-pressure refrigerant decompressed by the high-pressure side expansion valve 13 flows into the outdoor heat exchanger 20 through the gas-liquid separator 14, and the low-pressure side opening/closing valve 16b in that order. The low-pressure refrigerant flowing into the outdoor heat exchanger 20 exchanges heat with the outside air blown from the blower fan 21 to dissipate the heat therefrom (as indicated by the point $b2_7$ to a point $b3_7$ in FIG. 7). The following operation is the same as that in the cooling operation mode.

As mentioned above, in the second dehumidification and heating mode, like the first dehumidification and heating mode, the feed air cooled and dehumidified by the indoor evaporator 23 can be heated by the indoor condenser 12 to be blown out into the vehicle interior. Thus, the dehumidification and heating of the vehicle interior can be achieved.

At this time, in the second dehumidification and heating mode, the high-pressure side expansion valve 13 is throttled, which can decrease the temperature of the refrigerant flowing through the outdoor heat exchanger 20 as compared to the first dehumidification and heating mode. Thus, the difference in temperature between the refrigerant and the outside air in the outdoor heat exchanger 20 can be reduced to thereby decrease the amount of heat dissipated from the refrigerant at the outdoor heat exchanger 20.

As a result, the amount of heat dissipated from the refrigerant at the indoor condenser 12 can be increased to thereby improve the heating capacity of the indoor condenser 12 for the feed air as compared to the first dehumidification and heating operation mode.

(b)-3: Third Dehumidification and Heating Mode

Next, when the target outlet air temperature TAO is higher than a predetermined second reference temperature during the second dehumidification and heating mode, a third dehumidification and heating mode is performed. In the third dehumidification and heating mode, the throttle opening degree of the high-pressure side expansion valve 13 throttled is smaller than that in the second dehumidification and heating mode, and the throttle opening degree of the expansion valve 22 for cooling is larger than that in the second dehumidification and heating mode. Thus, in the third dehumidification and heating mode, the state of the refrigerant circulating through the cycle is changed as indicated by the Mollier chart of FIG. 8.

Figure 8:
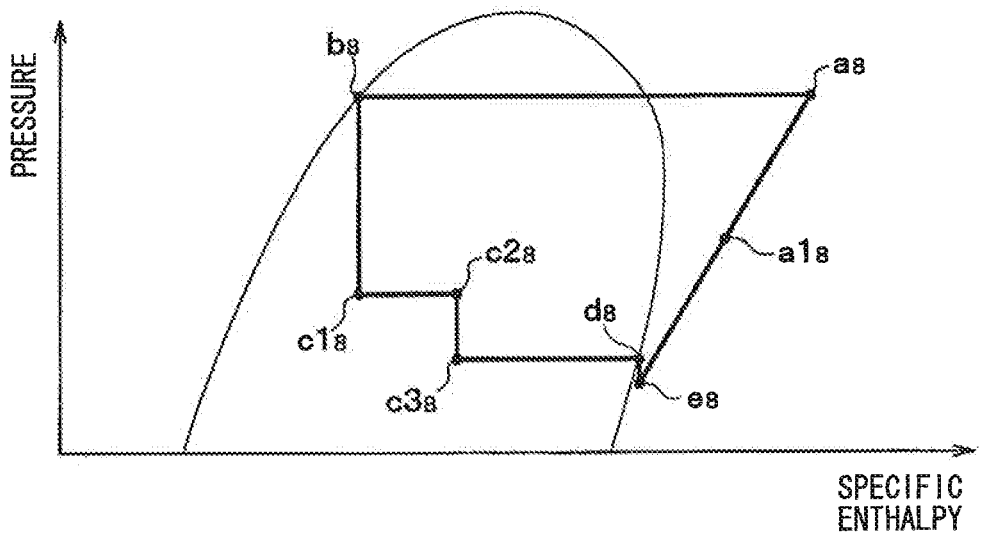
FIG. 8 is a Mollier chart showing the state of the refrigerant in a third dehumidification and heating operation mode of the heat pump cycle in the first embodiment.

That is, like the first and second dehumidification and heating mode, as shown in FIG. 8, the high-pressure refrigerant discharged from the discharge port 11c of the compressor 11 (as indicated by a point $a_8$ in FIG. 8) flows into the indoor condenser 12 to be cooled by the indoor evaporator 23, and exchanges heat with the feed air cooled and dehumidified by the indoor evaporator 23 to dissipate the heat therefrom (as indicated from the point $a_8$ to a point $b_8$ in FIG. 8). Thus, the feed air is heated.

The refrigerant flowing from the indoor condenser 12 is decompressed in an isenthalpic manner until it becomes the intermediate-pressure refrigerant whose temperature is lower than that of the outside air through the high-pressure side expansion valve 13 being throttled (as indicated by the point $b_8$ to a point $c1_8$ in FIG. 8). The intermediate-pressure refrigerant decompressed by the high-pressure side expansion valve 13 flows into the outdoor heat exchanger 20 through the gas-liquid separator 14, and the low-pressure side opening/closing valve 16b in that order.

And the low-pressure refrigerant flowing into the outdoor heat exchanger 20 exchanges heat with the outside air blown from the blower fan 21 to absorb the heat therefrom (as indicated by the point $c1_8$ to a point $c2_8$ in FIG. 8). Further, the refrigerant flowing from the outdoor heat exchanger 20 is decompressed by the expansion valve for heating in an isenthalpic manner (as indicated by the point $c2_8$ to a point $c3_8$ in FIG. 8) to flow into the indoor evaporator 23. The following operation is the same as that in the cooling operation mode.

As mentioned above, in the third dehumidification and heating mode, like the first and second dehumidification and heating mode, the feed air cooled and dehumidified by the indoor evaporator 23 can be heated by the indoor condenser 12 to be blown into the vehicle interior. Thus, the dehumidification and heating of the vehicle interior can be achieved.

At this time, in the third dehumidification and heating mode, the outdoor heat exchanger 20 acts as an evaporator by reducing the throttle opening degree of the high-pressure side expansion valve 13, so that the amount of heat absorbed by the refrigerant from the outside air can be increased to thereby increase the amount of heat dissipated from the refrigerant by the indoor condenser 12 as compared to the second dehumidification and heating mode. As a result, the heating capacity of the indoor condenser 12 for the feed air can be improved more than the second dehumidification and heating mode.

(b)-4: Fourth Dehumidification and Heating Mode

Next, when the target outlet air temperature TAO is higher than a predetermined third reference temperature during the third dehumidification and heating mode, a fourth dehumidification and heating mode is performed. In the fourth dehumidification and heating mode, the throttle opening degree of the high-pressure side expansion valve 13 throttled is smaller than that in the third dehumidification and heating mode, and the expansion valve 22 for cooling is fully opened. Thus, in the fourth dehumidification and heating mode, the state of the refrigerant circulating through the cycle is changed as indicated by the Mollier chart of FIG. 9.

Figure 9:
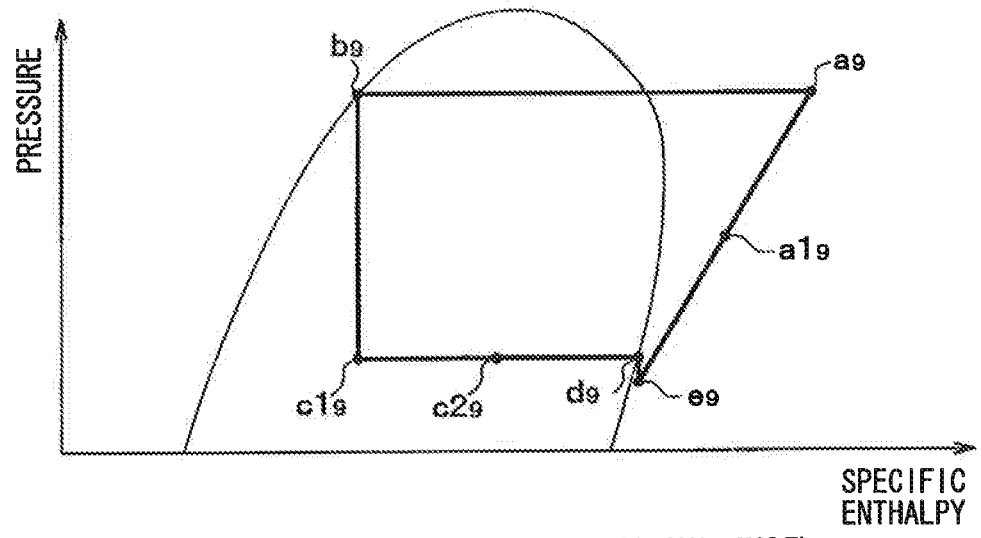
FIG. 9 is a Mollier chart showing the state of the refrigerant in a fourth dehumidification and heating operation mode of the heat pump cycle in the first embodiment.

That is, like the first and second dehumidification and heating mode, as shown in FIG. 9, the high-pressure refrigerant discharged from the discharge port 11c of the compressor 11 (as indicated by a point $a_9$ in FIG. 9) flows into the indoor condenser 12, and exchanges heat with the feed air cooled and dehumidified by the indoor evaporator 23 to dissipate the heat therefrom (as indicated by the point $a_9$ to a point $b_9$ in FIG. 9). Thus, the feed air is heated.

The refrigerant flowing from the indoor condenser 12 is decompressed in an isenthalpic manner until it becomes the low-pressure refrigerant whose temperature is lower than that of the outside air through the high-pressure side expansion valve 13 being throttled (as indicated by the point $b_9$ to a point $c1_9$ in FIG. 9). The intermediate-pressure refrigerant decompressed by the high-pressure side expansion valve 13 flows into the outdoor heat exchanger 20 through the gas-liquid separator 14, and the low-pressure side opening/closing valve 16b in that order.

And, the low-pressure refrigerant flowing into the outdoor heat exchanger 20 exchanges heat with the outside air blown from the blower fan 21 to absorb the heat therefrom (as indicated by the point $c1_9$ to a point $c2_9$ in FIG. 9). Further, the refrigerant flowing from the outdoor heat exchanger 20 flows into the indoor evaporator 23 without being decompressed because the expansion valve 22 for cooling is fully opened. The following operation is the same as that in the cooling operation mode.

As mentioned above, in the fourth dehumidification and heating mode, like the first to third dehumidification and heating modes, the feed air cooled and dehumidified by the indoor evaporator 23 can be heated by the indoor condenser 12 to be blown into the vehicle interior. Thus, the dehumidification and heating of the vehicle interior can be achieved.

At this time, in the fourth dehumidification and heating mode, like the third dehumidification and heating mode, the outdoor heat exchanger 20 acts as the evaporator, and the throttle opening degree of the high-pressure side expansion valve 13 is decreased as compared to the third dehumidification and heating mode, so that the refrigerant evaporator temperature of the outdoor heat exchanger 20 can be decreased.

Thus, the difference in temperature between the refrigerant and the outside air at the outdoor heat exchanger 20 is enlarged as compared to the third dehumidification and heating mode, so that the amount of heat of the refrigerant absorbed by the indoor heat exchanger 20 from the outside air can be increased. As a result, the amount of heat dissipated from the refrigerant in the indoor condenser 12 can be increased as compared to the third dehumidification and heating mode, which can improve the heating capacity of the indoor condenser 12 for the feed air.

(c) Heating Operation Mode

Next, the details of the heating operation mode performed in step S9 will be described below using FIGS. 10 to 15. FIGS. 10 to 14 are flowcharts showing control flows performed in the heating operation mode. First, in step S91 shown in FIG. 10, the control states of the respective expansion valves 13 and 22, the air mix door 34, and the refrigerant flow path switching portions 16a to 16c in the heating operation mode are determined.

Specifically, the high-pressure side expansion valve 13 is throttled to decompress the refrigerant, the expansion valve 22 for cooling is completely closed, the intermediate-pressure side opening/closing valve 16a is opened, the low-pressure side opening/closing valve 16b is closed, and the opening/closing valve 16c for cooling is opened.

The number of revolutions Nc of the compressor 11 is determined such that the high-pressure side refrigerant pressure Pd of the refrigerant in the heat pump cycle 10 flowing from the discharge port 11c of the compressor 11 to the inlet side of the high-pressure side expansion valve 13 approaches a target high pressure TPd by the feedback control method and the like.

In the heating operation mode, the refrigerant temperature Th in the indoor condenser 12 is controlled to basically approach the target outlet air temperature TAO, so that the target opening degree SWd of the air mix opening degree SW is determined to be the maximum opening degree (100%). Thus, the control signal to be output to the servo motor of the air mix door 34 is determined such that the air mix door 34 closes the bypass passage 35 while all volume of feed air passing through the indoor evaporator 23 passes through the indoor condenser 12.

Thus, in step S12 shown in FIG. 4, when the control signal or control voltage is output to the control device of interest, the heat pump cycle 10 performs switching to a refrigerant flow path for allowing the refrigerant to flow therethrough as indicated by a solid arrow in FIG. 2.

In subsequent step S92, the target high pressure TPd for the high-pressure side refrigerant pressure Pd of the refrigerant in the heat pump cycle 10 flowing from the discharge port 11c of the compressor 11 to the inlet side of the high-pressure side expansion valve 13 is determined, and then the operation proceeds to step S93. The target high pressure TPd is determined based on the target outlet air temperature TAO determined in step S4 of FIG. 4 with reference to a control map pre-stored in the air conditioning controller 40 such that the feed air has the target outlet air temperature TAO.

In step S93, it is determined whether or not the present number of revolutions Nc of the compressor 11 is increased up to the maximum number of revolutions Ncmax previously determined from the durability of the compressor 11, that is, whether the formula of Nc=Ncmax is satisfied or not. When the formula of Nc=Ncmax is determined not to be satisfied in step S93, the operation proceeds to step S94 in which sub-cool control is performed. In contrast, when the formula of Nc=Ncmax is satisfied, the operation proceeds to step S95.

The sub-cool control performed in step S94 will be described below using the flowchart of FIG. 11. The sub-cool control is the control performed when the formula of Nc=Ncmax is determined not to be satisfied in step S93, that is, when the refrigerant discharge capacity of the compressor 11 can be increased more than the present capacity. That is, the sub-cool control is the control corresponding to the normal control in the related art described above.

Figure 11:
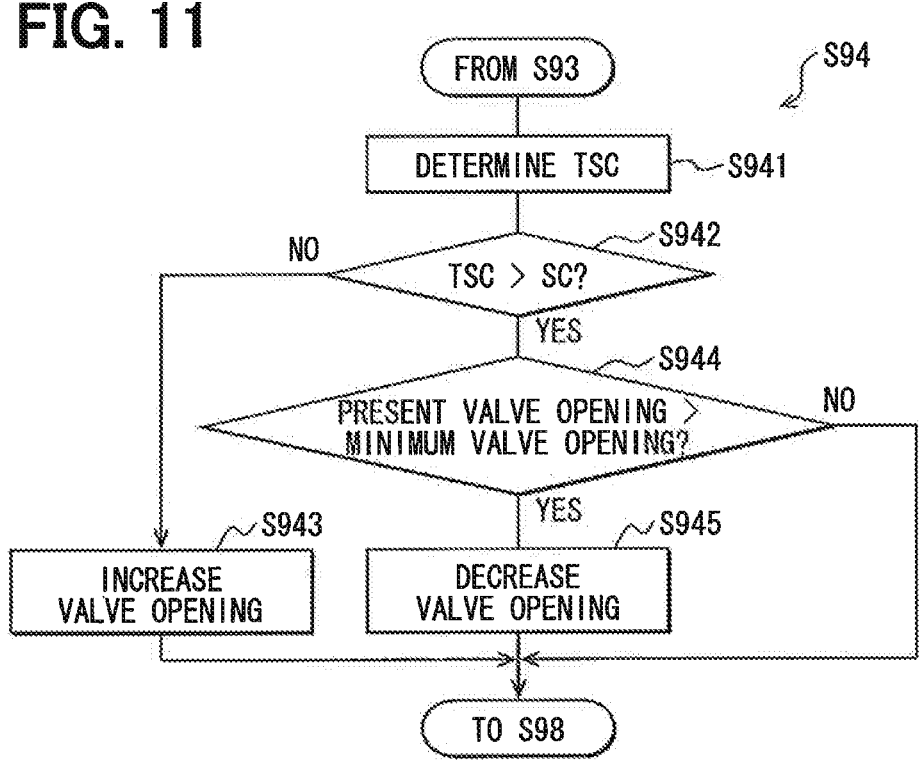
FIG. 11 is a flowchart showing another control process upon performing sub-cool control in the heating operation mode of the first embodiment.

In step S941 shown in FIG. 11, first, a target supercool degree TSC of the refrigerant flowing from the indoor condenser 12 is determined, and then the operation proceeds to step S942. Specifically, the target supercool degree TSC is determined based on the temperature and pressure of the refrigerant flowing from the indoor condenser 12 such that the cycle efficiency (COP) is maximized.

In step S942, it is determined whether or not the present supercool degree SC of the refrigerant flowing from the indoor condenser 12 calculated based on the temperature and pressure of the refrigerant flowing from the indoor condenser 12 is lower than the target supercool degree TSC. When the present supercool degree SC is determined to be lower than the target supercool degree TSC in step S942, the operation proceeds to step S944. When the present supercool degree SC is determined not to be lower than the target supercool degree TSC, the operation proceeds to step S943.

The term "supercool degree SC" as used in this embodiment is defined as an absolute value of a difference between the present temperature of the liquid-phase refrigerant and the temperature of the saturated liquid refrigerant having the same pressure as that of the liquid-phase refrigerant. Thus, the actual temperature of the liquid-phase refrigerant is decreased with increasing supercool degree SC. Then, in step S943, an opening degree of the high-pressure side expansion valve 13 is increased by a predetermined opening degree with respect to the present opening degree, and then the operation proceeds to step S98. As a result, the supercool degree SC is decreased to approach the target supercool degree TSC. Thus, the supercool degree SC is decreased to near the target supercool degree.

In step S944, it is determined whether or not the present opening degree of the high-pressure side expansion valve 13 is larger than the minimum valve opening degree. When the present opening degree of the high-pressure side expansion valve 13 is determined to be larger than the minimum valve opening degree in step S944, the operation proceeds to step S945, in which the opening degree of the high-pressure side expansion valve 13 is decreased by a predetermined opening degree with respect to the present valve opening degree, and then returns to step S98. As a result, the supercool degree SC is increased to approach the target supercool degree TSC.

In contrast, when the present opening degree of the high-pressure side expansion valve 13 is determined not to be larger than the minimum opening degree in step S944 (that is, when the present opening degree is the minimum opening degree), the present opening degree cannot be decreased as compared to the present value, and thus is kept. Then, the operation proceeds to step S98.

That is, when the refrigerant discharge capacity of the compressor 11 can be increased as compared to the present capacity in the sub-cool control performed in step S94, the opening degree of the high-pressure side expansion valve 13 is adjusted such that the supercool degree SC approaches the target supercool degree TSC, which performs the control to make the cycle efficiency maximum.

Figure 10:
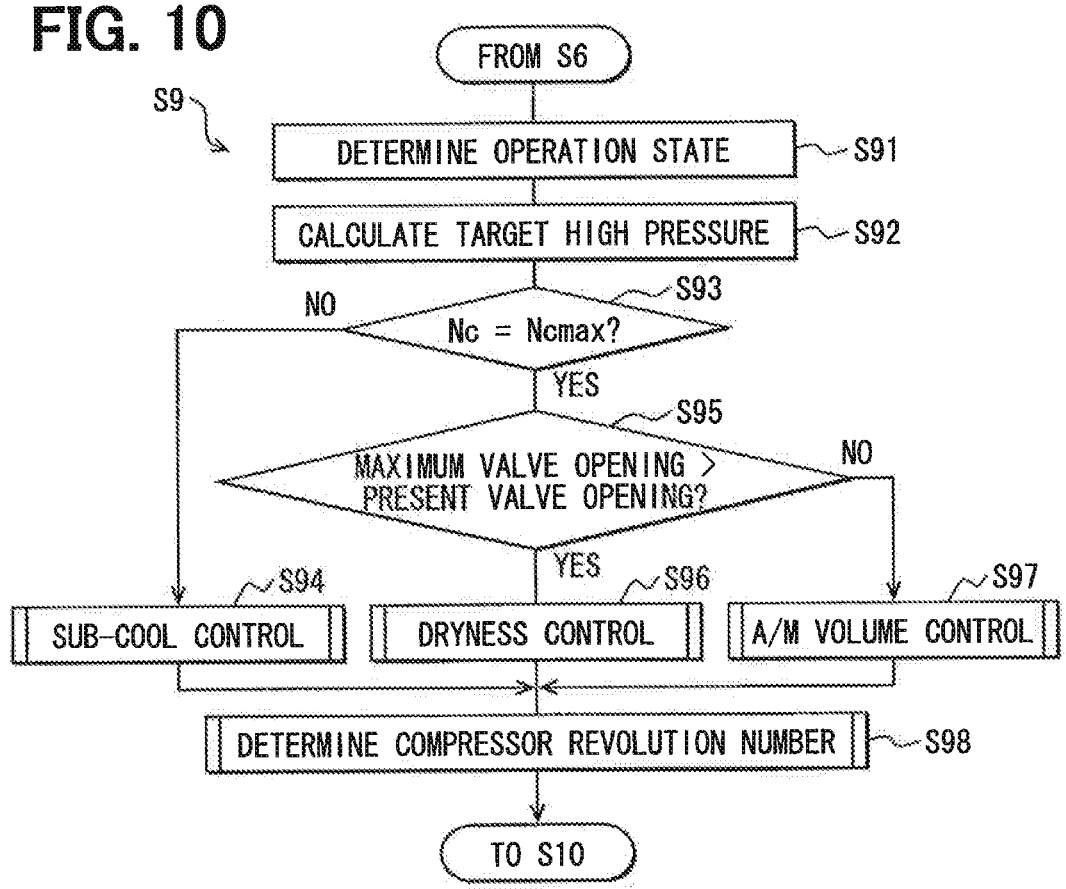
FIG. 10 is a flowchart showing another control process in the heating operation mode of the first embodiment.

Next, in step S95 of FIG. 10, it is determined whether or not the present opening degree of the high-pressure side expansion valve 13 is smaller than the maximum valve opening degree (in the fully opened state). When the present opening degree of the high-pressure side expansion valve 13 is determined to be smaller than the maximum valve opening degree in step S95, the operation proceeds to step S96 in which the dryness control is executed. When the present opening degree is determined not to be smaller than the maximum valve opening degree (that is, when the present opening degree is the maximum valve opening degree), the operation proceeds to step S97 in which the air mix volume control (A/M volume control) is executed.

The dryness control performed in step S96 will be described below using the flowchart shown in FIG. 12. The dryness control is the control performed when the refrigerant flowing from the indoor condenser 12 can be in a gas-liquid two-phase state by increasing the opening degree of the high-pressure side expansion valve 13 to a higher level than the present opening degree thereof. That is, the dryness control corresponds to the control performed at the time of the lack of the capacity as mentioned above in the related art.

In step S961, first, it is determined whether or not the present high-pressure side refrigerant pressure Pd is lower than the target high pressure TPd determined in step S92. When the present high-pressure side refrigerant pressure Pd is determined to be lower than the target high pressure TPd in step S961, the operation proceeds to step S962. When the present high-pressure side refrigerant pressure Pd is determined not to be lower than the target high pressure TPd (that is, when the present high-pressure side refrigerant pressure Pd is determined to be equal to or more than the target high pressure TPd), the operation proceeds to step S964.

In step S962, it is determined whether or not the present opening degree of the high-pressure expansion valve 13 is smaller than the maximum valve opening degree (in the fully opened state). When the present opening degree of the high-pressure side expansion valve 13 is determined to be smaller than the maximum valve opening degree in step S962, the operation proceeds to step S963. In step S963, the opening degree of the high-pressure expansion valve 13 is increased by a predetermined opening degree with respect to the present opening degree, and then the operation returns to step S98.

When the present opening degree of the high-pressure side expansion valve 13 is determined not to be smaller than the maximum valve opening degree in step S962 (that is, when the present opening degree becomes the maximum valve opening degree), the valve opening cannot be increased above the present value, and thus the present opening degree is kept. Then, the operation returns to step S98.

In step S964, it is determined whether or not the present opening degree of the high-pressure side expansion valve 13 is larger than the minimum valve opening degree. When the present opening degree of the high-pressure side expansion valve 13 is determined to be larger than the minimum valve opening degree in step S964, the operation proceeds to step S965, in which the opening degree of the high-pressure side expansion valve 13 is decreased only by a predetermined opening degree with respect to the present valve opening. Then, the operation returns to step S98.

When the present opening degree of the high-pressure side expansion valve 13 is determined not to be larger than the minimum valve opening degree in step S964 (that is, when the present opening degree becomes the minimum valve opening degree), the valve opening cannot be decreased as compared to the present value, and thus the present opening degree is kept. Then, the operation returns to step S98.

That is, in the dryness control performed in step S96, when the refrigerant discharge capacity of the compressor 11 cannot be increased as compared to the present capacity, the opening degree of the high-pressure side expansion valve 13 is increased to thereby increase the dryness of the refrigerant flowing from the indoor condenser 12. Thus, the flow rate of the refrigerant flowing into the intermediate-pressure port 11b of the compressor 11 (gas injection amount) is increased to thereby increase the temperature of the feed air up to the target outlet air temperature TAO.

Figure 13:
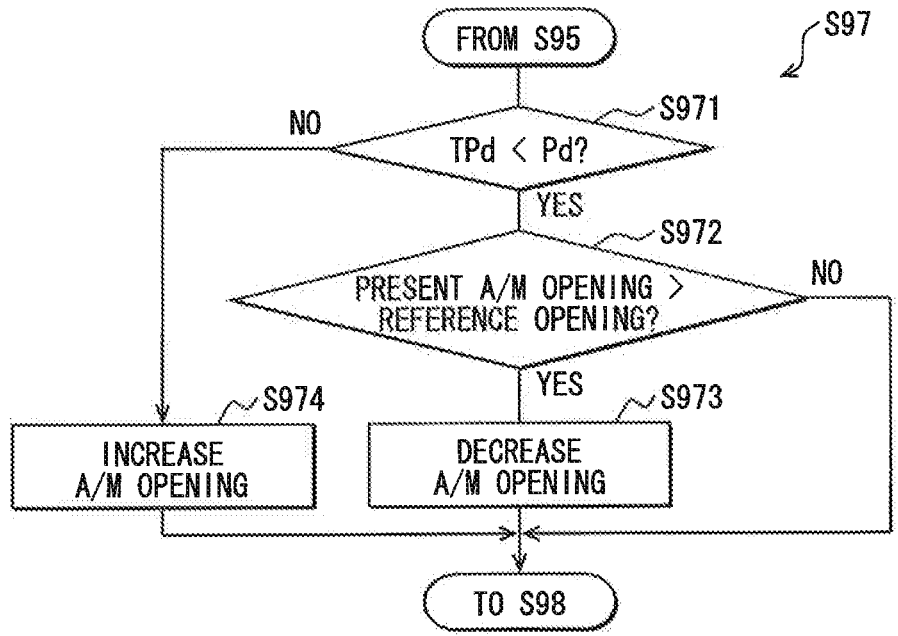
FIG. 13 is a flowchart showing another control process upon performing air mix volume control in the heating operation mode of the first embodiment.
Figure 14:
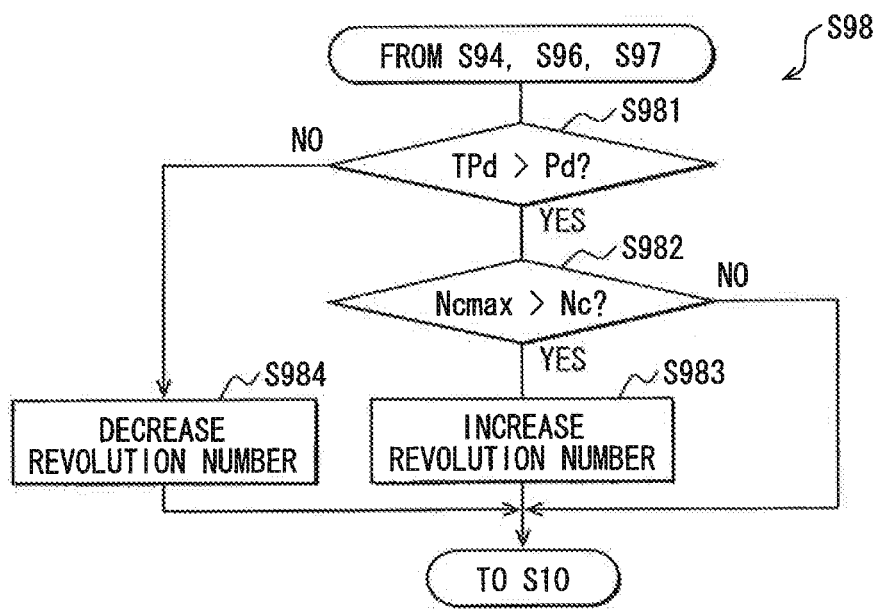
FIG. 14 is a flowchart showing a main part of the control process of the air conditioner for a vehicle in the first embodiment.

Next, the air mix volume control performed in step S97 shown in FIG. 10 will be described below using a flowchart of FIG. 13. The air mix volume control is performed when the number of revolutions Nc of the compressor 11 becomes the maximum number of revolutions Ncmax, while the present opening degree of the high-pressure expansion valve 13 becomes the maximum valve opening degree. That is, the air mix volume control is performed when the temperature of the feed air cannot be increased up to the target outlet air temperature TAO by the control of the number of revolutions of the compressor 11 and the control of the opening degree of the high-pressure side expansion valve 13.

In step S971, first, it is determined whether or not the present high-pressure side refrigerant pressure Pd is higher than the target high pressure TPd determined in step S92. When the present high-pressure side refrigerant pressure Pd is determined to be higher than the target high-pressure TPd in step S971, the operation proceeds to step S972. When the present high-pressure side refrigerant pressure Pd is determined not to be higher than the target high-pressure TPd in step S971, the operation proceeds to step S974.

In step S972, it is determined whether or not the present opening degree SW of the air mix door 34 (present A/M opening) is larger than a predetermined reference opening degree. The reference opening degree is set to the minimum air mix opening degree (for example, 50%) that can be actually set, for example, in the heating operation mode. When the opening degree SW of the air mix door 34 is decreased, the volume of the feed air passing through the bypass passage 35 is increased, and the volume of the feed air passing through the indoor condenser 12 is decreased. When the opening degree SW of the air mix door 34 is increased, the volume of the feed air passing through the bypass passage 35 is decreased, and the volume of the feed air passing through the indoor condenser 12 is increased.

When the present air mix opening degree SW is determined to be larger than the reference opening degree in step S972, the operation proceeds to step S973. In step S973, the target opening degree SWd is changed such that the air mix door opening degree SW is decreased by a predetermined opening degree, and then the operation returns to step S98. Specifically, in step S973, the target opening degree SWd is changed to another target opening degree SWd' which is smaller by a predetermined value than the target opening degree SWd calculated by the formula F1. The control signal to the servo motor of the air mix door 34 is determined by the feedback control method such that the air mix door opening degree SW approaches the changed target opening degree SWd'.

When the present air mix opening degree SW is determined to be larger than the reference opening degree in step S972, the present opening degree SW is kept without being decreased as compared to the present value, and then the operation proceeds to step S98. In step S974, the air mix door opening degree SW is increased by a predetermined opening degree, and then the operation returns to step S98.

In step S98 shown in FIG. 10, the number of revolutions Nc of the compressor 11 is determined by the feedback control method such that the high-pressure side refrigerant pressure Pd approaches the target high pressure TPd. The determination of the number of revolutions Nc of the compressor 11 will be described below using the flowchart shown in FIG. 14. First, in step S981, it is determined whether or not the present high-pressure side refrigerant pressure Pd is lower than the target high pressure TPd determined in step S92.

When the present high-pressure side refrigerant pressure Pd is determined to be lower than the target high pressure TPd in step S981, the operation proceeds to step S982. In step S982, it is determined whether or not the present number of revolutions Nc of the compressor 11 is lower than the maximum number of revolutions Ncmax. When the present number of revolutions Nc of the compressor 11 is determined to be lower than the maximum number of revolutions Ncmax in step S982, the operation proceeds to step S983, in which the number of revolutions Nc of the compressor 11 is increased by the predetermined number of revolutions, and then the operation proceeds to step S10 shown in FIG. 4.

When the present number of revolutions Nc of the compressor 11 is determined not to be lower than the maximum number of revolutions Ncmax (that is, the present number of revolutions Nc of the compressor 11 is the maximum number of revolutions Ncmax) in step S982, the number of revolutions Nc of the compressor 11 cannot be increased from the present number, and thus the present number of revolutions Nc is kept. Then, the operation returns to step S10 shown in FIG. 4.

When the present high-pressure side refrigerant pressure Pd is determined not to be lower than the target high pressure TPd in step S981, the operation proceeds to step S984, in which the number of revolutions Nc of the compressor 11 is decreased by a predetermined number of revolutions, and the operation returns to step S10 shown in FIG. 4.

Figure 15:
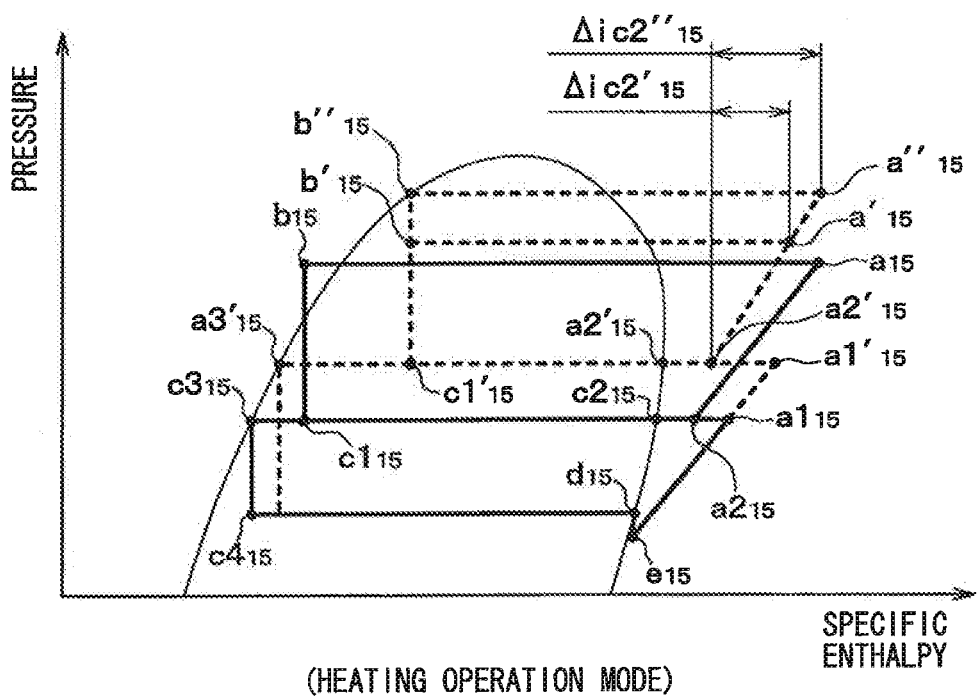
FIG. 15 is a Mollier chart showing the state of the refrigerant in the heating operation mode of the heat pump cycle in the first embodiment.

When the above control flow is performed in the heating operation mode, the state of the refrigerant in the heat pump cycle 10 is changed as indicated by the Mollier chart shown in FIG. 15. As shown in FIG. 15, the change in state of the refrigerant upon the sub-cool control is represented by a thick solid line, the change in state of the refrigerant during a time period from the sub-cool control to the dryness control is represented by a thick broken line, and the change in state of the refrigerant during a time period from the dryness control to the air mix volume control is represented by a thick dashed-dotted line.

When the sub-cool control is performed as described in the control step S93 (see FIG. 11) during the heating operation mode, the high-pressure refrigerant (as indicated by a point $a_{15}$ in FIG. 15) discharged from the discharge port 11c of the compressor 11 flows into the indoor condenser 12. The refrigerant flowing into the indoor condenser 12 exchanges heat with the air blown from the blower 32 and passing through the indoor evaporator 23 to dissipate the heat therefrom (as indicated from the point $a_{15}$ to a point $b_{15}$ in FIG. 15). Thus, the feed air is heated.

The refrigerant flowing from the indoor condenser 12 is decompressed and expanded in an isenthalpic manner until it becomes the intermediate-pressure refrigerant by the throttled high-pressure side expansion valve 13 (as indicated by the point $b_{15}$ to a point $c1_{15}$ in FIG. 15). Then, the intermediate-pressure refrigerant decompressed by the high-pressure side expansion valve 13 is separated into gas and liquid phases by the gas-liquid separator 14 (as indicated by from the point $c1_{15}$ to a point $c2_{15}$ and from the point c1 to a point $c3_{15}$ in FIG. 15).

Since the intermediate-pressure opening/closing valve 16a is opened, the gas-phase refrigerant separated by the gas-liquid separator 14 flows into the intermediate-pressure port 11b of the compressor 11 via the intermediate pressure refrigerant passage 15 (as indicated from the point $c2_{15}$ to a point $a2_{15}$ in FIG. 15), and is mixed into the refrigerant discharged from a low-pressure side compression mechanism (as indicated by the point $a1_{15}$ in FIG. 15) to be sucked into the high-pressure side compression mechanism.

Since the low-pressure side opening/closing valve 16b is closed, the liquid-phase refrigerant separated by the gas-liquid separator 14 flows into the low-pressure side fixed throttle 17, and is decompressed and expanded in an isenthalpic manner until it becomes the low-pressure refrigerant (as indicated by the point $c3_{15}$ to a point $c4_{15}$ in FIG. 15). The refrigerant flowing from the low-pressure side fixed throttle 17 flows into the outdoor heat exchanger 20 and exchanges heat with outside air blown from the blower fan 21 to absorb the heat therefrom (as indicated by the point $c4_{15}$ to a point $d_{15}$ in FIG. 15).

Since the opening/closing valve 16c for cooling is opened, the refrigerant flowing from the outdoor heat exchanger 20 flows into the accumulator 24 via the passage 25 for expansion valve bypass to be separated into gas and liquid phases. Then, the separated gas-phase refrigerant is sucked into the suction port 11a of the compressor 11 (as indicated by a point θ15 in FIG. 15). In contrast, in order for the separated liquid-phase refrigerant to exhibit the refrigeration capacity required for the cycle, the unnecessary excessive refrigerant is stored in the accumulator 24.

Thus, in the sub-cool control during the heating operation mode, heat contained in the high-temperature and high-pressure refrigerant discharged from the compressor 11 at the indoor condenser 12 is dissipated into the feed air, so that the heated indoor feed air can be blown into the vehicle interior. Thus, the heating of the vehicle interior can be achieved. At this time, the sub-cool control is performed such that the refrigerant flowing from the indoor condenser 12 (at a point $b_{15}$ in FIG. 15) becomes a supercool liquid-phase refrigerant, which can maximize the cycle efficiency.

Figure 12:
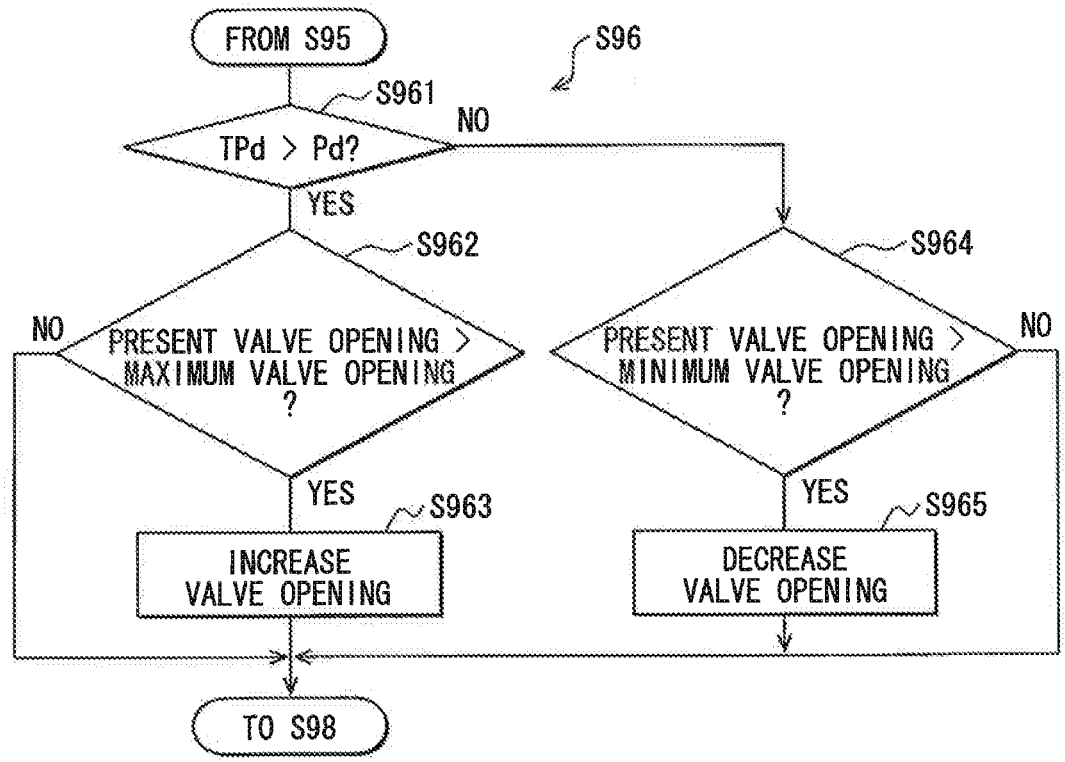
FIG. 12 is a flowchart showing another control process upon performing dryness control in the heating operation mode of the first embodiment.

When the indoor condenser 12 cannot exhibit enough heating capacity in the sub-cool control to increase the temperature of feed air blown into the vehicle interior to the target outlet air TAO even by increasing the number of revolutions Nc of the compressor 11 to the maximum number Nc of revolutions, the sub-cool control is transferred to the dryness control shown in control step S96 (see FIG. 12).

When transferred to the dryness control, the state of the refrigerant is changed as indicated by the thick broken line of FIG. 15. In FIG. 15, the refrigerant in the dryness control in the same state as the refrigerant in the sub-cool control is represented by a reference character of the corresponding refrigerant in the sub-cool control additionally attached with a mark (').

Since in the dryness control, the opening degree of the high-pressure side expansion valve 13 is increased to thereby increase the dryness of the refrigerant flowing from the indoor condenser 12, the state of the refrigerant flowing from the indoor condenser 12 is changed to a point $b'_{15}$ shown in FIG. 15. Further, the pressure of the refrigerant flowing from the intermediate-pressure port 11b of the compressor 11 (as indicated by a point $c2'_{16}$ and the like in FIG. 15) and the pressure of the refrigerant discharged from the discharge port 11c of the compressor 11 (as indicated by a point $a'_{15}$ and the like in FIG. 15) are increased as compared to the sub-cool control.

Thus, as compared to the sub-cool control, the temperature of the refrigerant discharged from the compressor 11 can be increased to enlarge a difference in temperature between the high-pressure refrigerant flowing through the indoor condenser 12 and the feed air flowing into the indoor condenser 12, while increasing the flow rate of gas-phase refrigerant flowing from the intermediate-pressure port 11b of the compressor 11 (gas injection amount). As a result, in the dryness control, the heating capacity of the feed air in the indoor condenser 12 can be improved as compared to the sub-cool control.

In the dry control, as mentioned above, the heating capacity of the indoor condenser 12 can be expected to be improved, but the difference in enthalpy between the inlet and outlet of the indoor condenser 12 would be decreased as compared to the sub-cool control (as indicated from the difference in enthalpy between the point $a_{15}$ and the point $b_{15}$, to the difference in enthalpy between the point $a'_{15}$ and the point $b'_{15}$ in FIG. 15). When the opening degree of the high-pressure side expansion valve 13 is increased to above a certain value, the heating capacity cannot be increased.

This embodiment transfers the dryness control to the air mix volume control described in the control step S97 (see FIG. 13) when the indoor condenser 12 cannot exhibit enough heating capacity to increase the temperature of feed air blown into the vehicle interior to the target outlet air temperature TAO even if the opening degree of the high-pressure side expansion valve 13 is increased to the maximum valve opening degree in the dryness control. That is, the dryness control is transferred to the air mix volume control when the temperature of feed air blown into the vehicle interior is equal to or less than the target outlet air temperature TAO in the dryness control.

In transferring to the air mix volume control, the state of the refrigerant is changed as indicated by the thick dashed-dotted line in FIG. 15. FIG. 15 indicates the refrigerant in the dryness control in the same state as the refrigerant in the sub-cool control by a reference character of the corresponding refrigerant in the sub-cool control additionally attached with a mark (").

In the air mix volume control, the opening degree SW of the air mix door 34 is decreased to allow a part of the feed air passing through the indoor evaporator 23 to flow into the bypass passage 35. Thus, the volume of the feed air flowing into the indoor condenser 12 is decreased as compared to the sub-cool control and the dryness control, whereby the indoor condenser 12 temporarily decreases the amount of heat absorbed in the feed air, that is, the amount of heat dissipated from the refrigerant into the feed air.

Thus, the heat exchange capacity of the indoor condenser 12 is substantially decreased, so that the cycle balance of the heat pump cycle 10 is achieved so as to increase the refrigerant pressure inside the indoor condenser 12 (as indicated by a point $a''_{15}$ and a point $b''_{15}$ in FIG. 15). Thus, the temperature of the refrigerant discharged from the compressor 11 is increased, which can enlarge the difference in temperature between the refrigerant flowing through the indoor condenser 12 and the feed air flowing into the indoor condenser 12.

Further, during a compression stage of the high-pressure side compression mechanism of the compressor 11 (that is, a compression stage leading from the intermediate-pressure port 11b to the discharge port 11c as indicated from the point $a2'_{15}$ to a point $a'''_{15}$ in FIG. 15), the compression work amount can be increased to thereby increase a difference in enthalpy between the outlet and inlet of the indoor condenser 12 with respect to the dryness control (as indicated from $\Delta ic2'_{15}$ to $\Delta ic2''_{15}$ in FIG. 15).

As a result, in the air mix volume control, the heating capacity of the indoor condenser 12 for the feed air can be improved as compared to the dryness control. The effects of improvement of the heating capacity in the air mix volume control will be described below using FIGS. 16A, 16B, and 17.

Figure 16A:
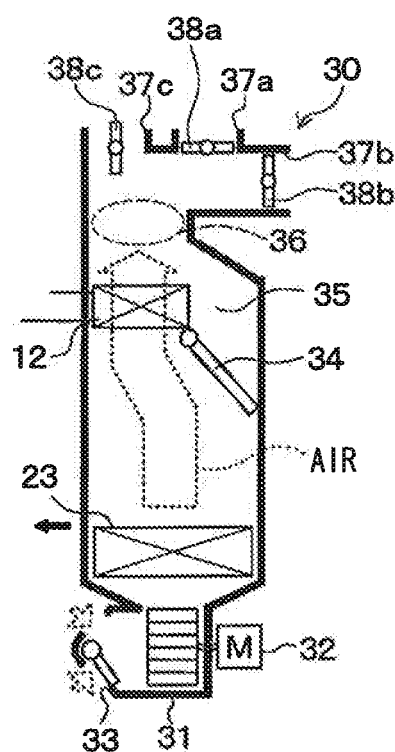
FIG. 16A is an explanatory diagram for explaining the state of increasing the temperature of the feed air upon performing the sub-cool control and the dryness control in the first embodiment.
Figure 16B:
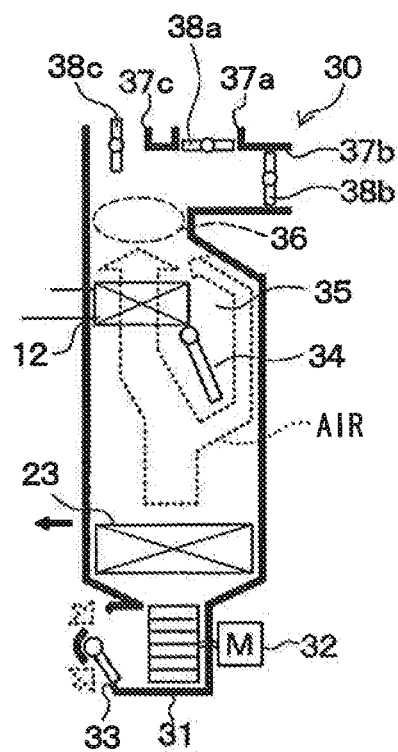
FIG. 16B is an explanatory diagram for explaining the state of increasing the temperature of the feed air upon performing the air mix volume control in the first embodiment.

FIGS. 16A and 16B are explanatory diagrams using parts of the indoor air conditioning unit 30 shown in FIGS. 1 and 2. FIG. 16A shows the sub-cool control and the dryness control, and FIG. 16B shows the air mix volume control. FIG. 17 shows a diagram showing the change in state of the refrigerant in the cycle upon transferring from the sub-cool control to the dryness control, and upon transferring from the dryness control to the air mix volume control.

As shown in FIG. 16A, since in the sub-cool control and the dryness control, the air mix door 34 is set to the maximum opening degree (100%) for closing the bypass passage 35, the temperature of the feed air in the mixing space 36 for communicating air outlets for blowing the feed air into the vehicle interior (feed air temperature in a range represented by a dotted line in FIG. 16A) has the same temperature as that of the feed air heated by the indoor condenser 12.

As shown in FIG. 16B, since in the air mix volume control, the opening degree SW of the air mix door 34 is decreased, the feed air temperature of the mixing space 36 (feed air temperature in a range represented by a dotted line in FIG. 16B) becomes a temperature of a mixture of the feed air with a high temperature heated by the indoor condenser 12, and the feed air with a lower temperature passing through the bypass passage 35.

At this time, in the air mix volume control, as shown in FIG. 17, this embodiment can increase the amount of dissipated heat corresponding to an increase in compression work amount which is obtained by multiplying the difference in enthalpy $\Delta ic2$ between the suction side refrigerant and the discharge side refrigerant in the high-pressure side compressor by the flow rate of refrigerant discharged from the compressor 11 (Gr1+Gr2). Thus, the temperature of feed air inside the mixing space 36 can be increased in the air mix volume control as compared to the sub-cool control or the dryness control.

That is, in the air mix volume control of this embodiment, the temperature of the feed air is extremely effective from the view point of being capable of increasing the temperature of the feed air without decreasing the flow rate of feed air flowing into the mixing space 36, that is, the flow rate of feed air blown into the vehicle interior as compared to the sub-cool control or the dryness control.

Second Embodiment

Figure 18:
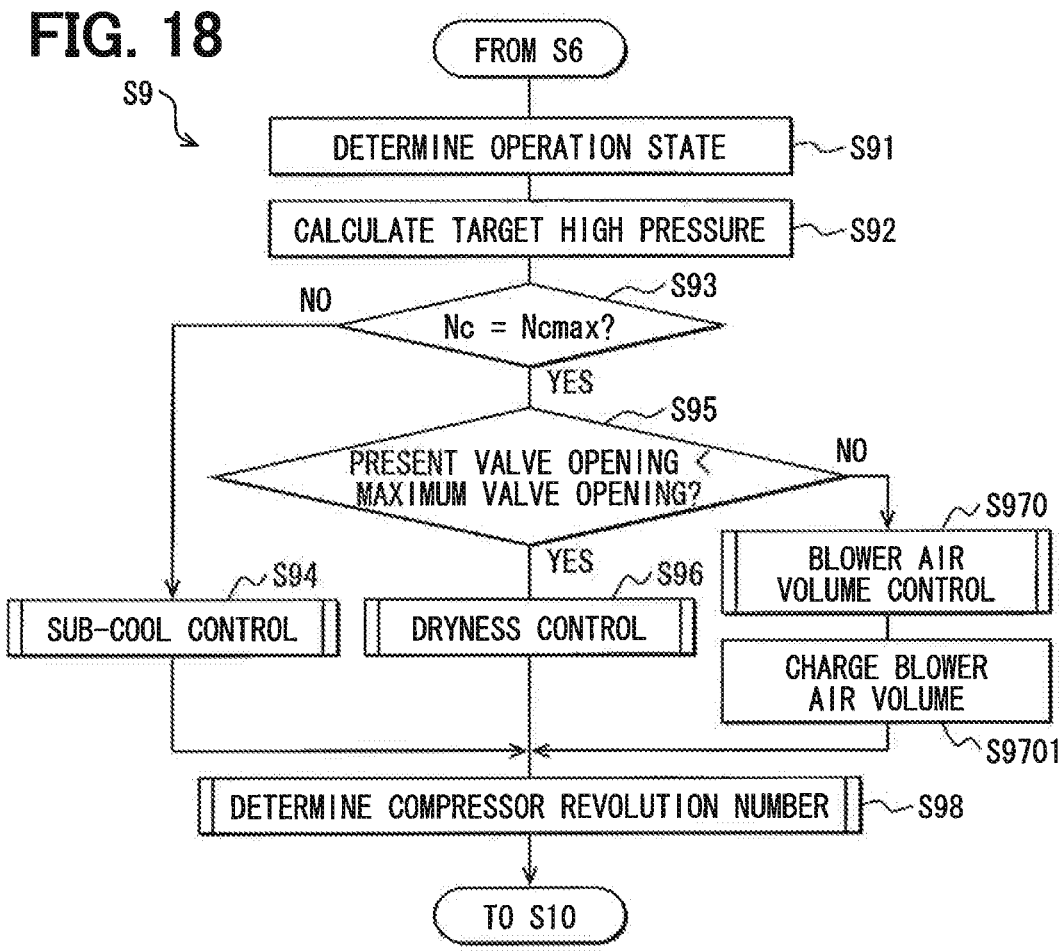
FIG. 18 is a flowchart showing a control process in a heating operation mode of a second embodiment.
Figure 19:
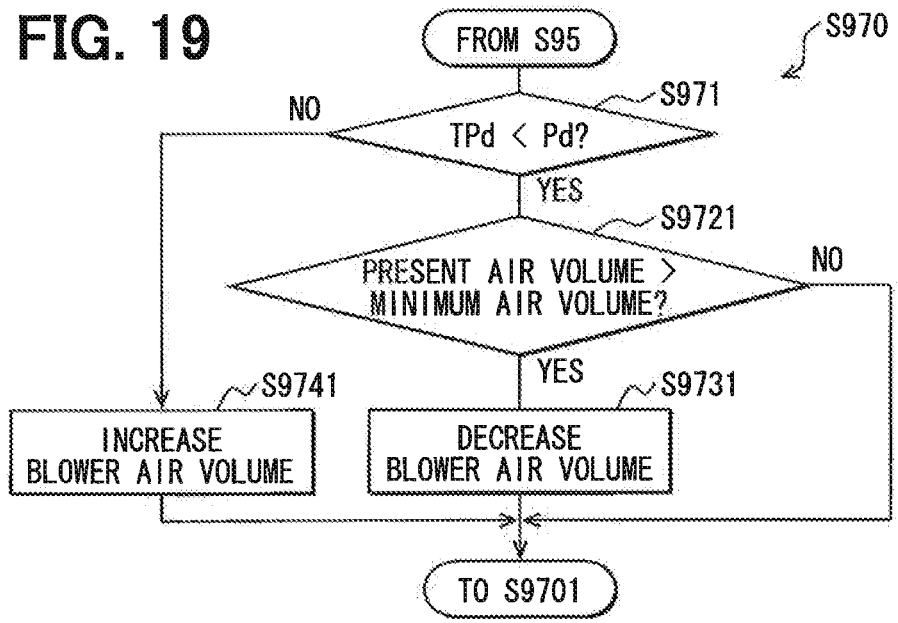
FIG. 19 is a flowchart showing another control process in controlling a blower air volume in the heating operation mode of the second embodiment.

This embodiment will describe below a modified example of the control form in the heating operation mode (control step S9) of the first embodiment. Specifically, in step S9 of this embodiment, a blower air volume control is performed as shown in FIGS. 18 and 19. FIGS. 18 and 19 are flowcharts corresponding to FIGS. 10 and 13 of the first embodiment. The control step including the same control process as that of the first embodiment are represented by the same reference character. The same goes for the following flowchart.

Specifically, in step S9 of this embodiment as shown in FIG. 18, step S97 of the first embodiment is changed to step S970 to thereby perform the blower air volume control. The blower air volume control will be described below using the flowchart of FIG. 19. The blower air volume control is performed when the temperature of the feed air cannot be increased up to the target outlet air temperature TAO in the control of the number of revolutions of the compressor 11 (sub-cool control) and the control of the valve opening (dryness control) of the high-pressure side expansion valve 13.

First, like the first embodiment, in step S971, it is determined whether or not the present high-pressure side refrigerant pressure Pd is higher than the target high-pressure TPd determined in step S92. When the relationship of TPd<Pd is satisfied, the operation proceeds to step S9721. When the relationship of TPd<Pd is not satisfied, the operation proceeds to step S9741.

In step S9721, it is determined whether or not the present volume of air by the blower 32 (target air volume) determined in step S5 is larger than the minimum air volume. If the present target air volume of the blower 32 is determined to be larger than the minimum air volume in step S9721, the operation proceeds to step S9731, in which the target air volume of the blower 32 is decreased by a predetermined air volume, and then the operation proceeds to step S9701 in FIG. 18.

In contrast, when the present target air volume of the blower 32 is determined not to be larger than the minimum air volume in step S9721 (that is, when the present target air volume of the blower 32 is the minimum air volume), the air volume of the blower 32 cannot be decreased any more from the present value, so that the present target air volume is kept, and then the operation returns to step S9701.

In step S9741, the target air volume of the blower 32 is increased by a predetermined air volume, and then the operation proceeds to step S9701. In step S9701, the target air volume of the blower 32 is changed to a value determined in step S970.

Other structures and operation are the same as those of the first embodiment. Thus, in this embodiment, the blower 32 serves as a flow rate adjustment portion for adjusting the flow rate (air volume) of the feed air flowing into the indoor condenser 12. By decreasing the flow rate of the blower 32 by the blower air volume control, the amount of heat dissipated from the refrigerant into the feed air at the indoor condenser 12 can be reduced as compared to the sub-cool control and the dryness control.

As a result, in the blower air volume control, the air volume of the feed air blown into the vehicle interior is decreased as compared to the air mix volume control of the first embodiment, but the heating capacity for increasing the temperature of the feed air blown into the vehicle interior from the mixing space 36 can be improved as compared to the sub-cool control and the dryness control.

Third Embodiment

Figure 20:
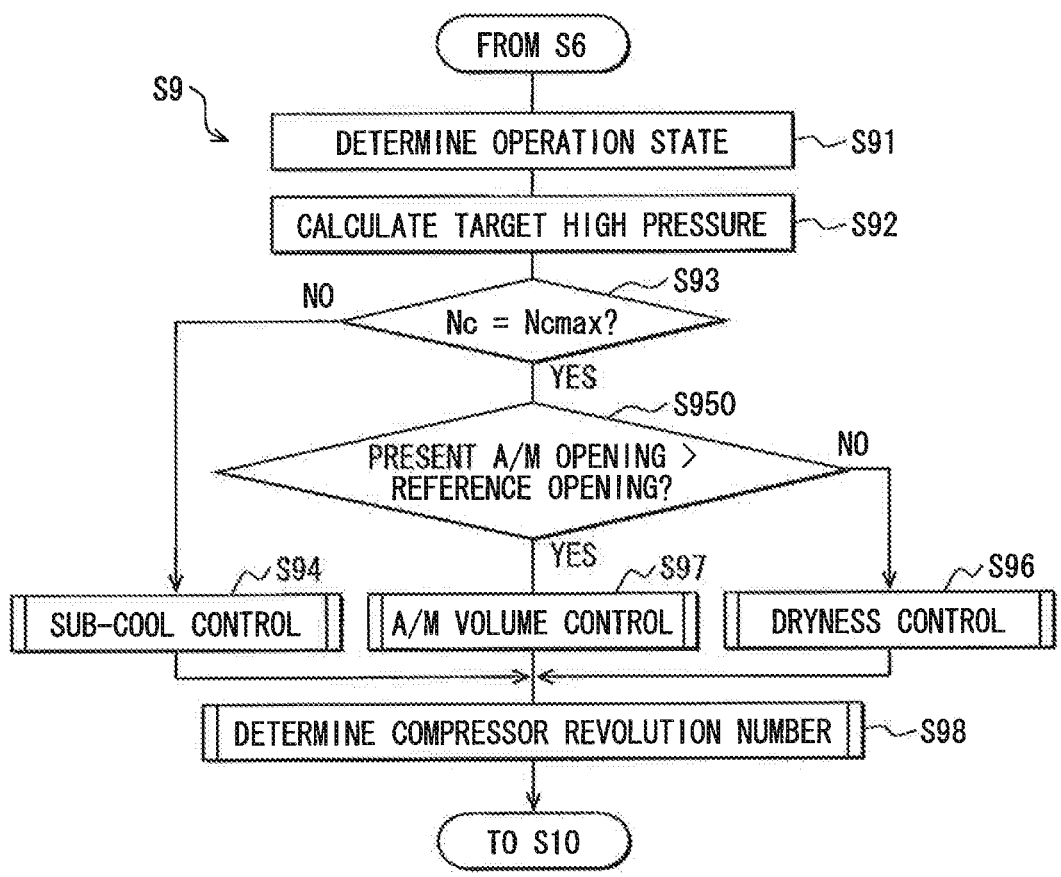
FIG. 20 is a flowchart showing a control process in a heating operation mode of a third embodiment.

As shown in FIG. 20, this embodiment will describe below a modified example of the control form in the heating operation mode (control step S9) of the first embodiment. FIG. 20 is a flowchart corresponding to FIG. 10 of the first embodiment. Specifically, in step S9 of this embodiment shown in FIG. 20, step S95 of the first embodiment is changed to step S950.

In step S950, it is determined whether or not the present opening degree SW of the air mix door 34 is larger than the predetermined reference opening degree (for example, 50%). When the present opening degree SW of the air mix door 34 is determined to be larger than the reference opening degree in step S950, the operation proceeds to step S97, in which the air mix volume control (A/M volume control) is performed.

When the present air mix opening degree SW is determined to be not larger than the reference opening degree in step S950, the present opening degree SW is maintained without decreasing the air mix opening degree SW from the present value of the opening degree, and then the operation proceeds to step S96, in which the dryness control is performed. Other structures and operations are the same as those in the first embodiment.

When the indoor condenser 12 cannot exhibit enough heating capacity to increase the temperature of the feed air blown into the vehicle interior up to the target outlet air temperature TAO even by increasing the number of revolutions Nc of the compressor 11 up to the maximum number of revolutions Nc in the sub-cool control, this embodiment performs the air mix volume control ahead of the dryness control.

The indoor condenser 12 cannot often exhibit enough heating capacity to increase the temperature of the feed air blown into the vehicle interior up to the target outlet air temperature TAO even after decreasing the air mix opening degree SW to the reference opening degree in the air mix volume control. In this case, the air mix volume control is transferred to the dryness control. That is, this embodiment differs in the first embodiment in priority between the dryness control and the air mix volume control. Therefore, even the refrigerant cycle device of this embodiment can be operated to obtain the same effects as those of the first embodiment.

In other words, in the first embodiment, after the high-pressure side expansion valve (high-pressure side decompressor) 13 increases the throttle opening degree, the air mix door (flow rate adjustment portion) 34 decreases the flow rate of the feed air (fluid for heat exchange) flowing into the indoor condenser (user-side heat exchanger) 12. In this embodiment, after the air mix door (flow rate adjustment portion) 34 decreases the flow rate of the blown air (fluid for heat exchange) into the indoor condenser (user-side heat exchanger) 12, the high-pressure side expansion valve (high-pressure side decompressor) 13 increases the throttle opening degree.

Also, in the second embodiment, when the decrease in volume of the feed air blown into the vehicle interior is not problematic, the sub-cool control may be transferred to the blower volume control ahead of the dryness control, like this embodiment.

Fourth Embodiment

This embodiment will describe a modified example in which the control form of the air mix volume control is changed in the heating operation mode, as compared to the first embodiment.

The air mix volume control described in the first embodiment decreases the air mix opening degree SW to increase a refrigerant pressure of the inside of the indoor condenser 12, and thus can improve the heating capacity of the indoor condenser 12.

Figure 21:
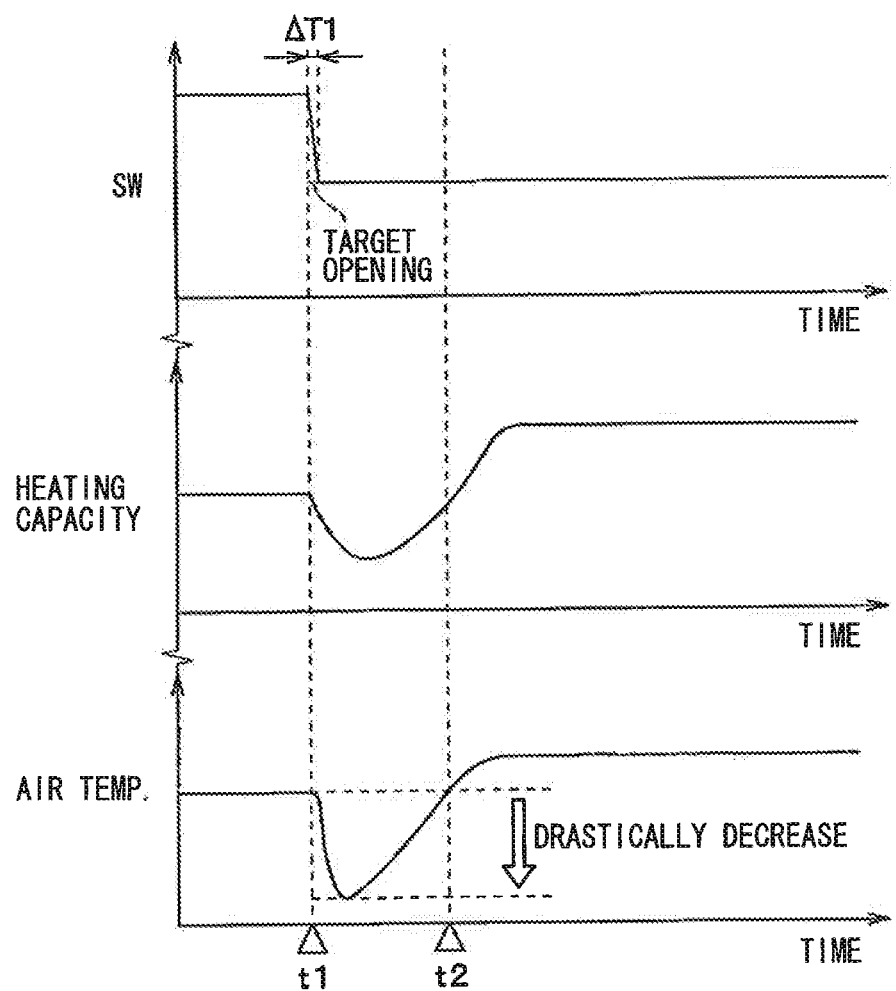
FIG. 21 is a diagram for explaining changes in opening degree of the air mix door, in heating capacity of an indoor condenser, and in temperature of blown air at the startup of the air mix volume control in the first embodiment.

As shown in FIG. 21, the air mix volume control requires a time to stabilize the cycle balance of the heat pump cycle 10 after decreasing the air mix opening degree SW and then to improve the heating capacity of the feed air in the indoor condenser 12. During this time (from the time t1 to the time t2), the volume of the low-temperature air passing through the bypass passage 35 is increased, whereby the temperature of air mixed in the mixing space 36 is decreased to drastically decrease the temperature of the blown air into the vehicle interior.

In the air mix volume control of this embodiment, when the opening degree of the air mix door 34 is decreased, the responsivity of the air mix door 34 is delayed as compared to any time other than the time of execution of the air mix volume control.

Figure 22:
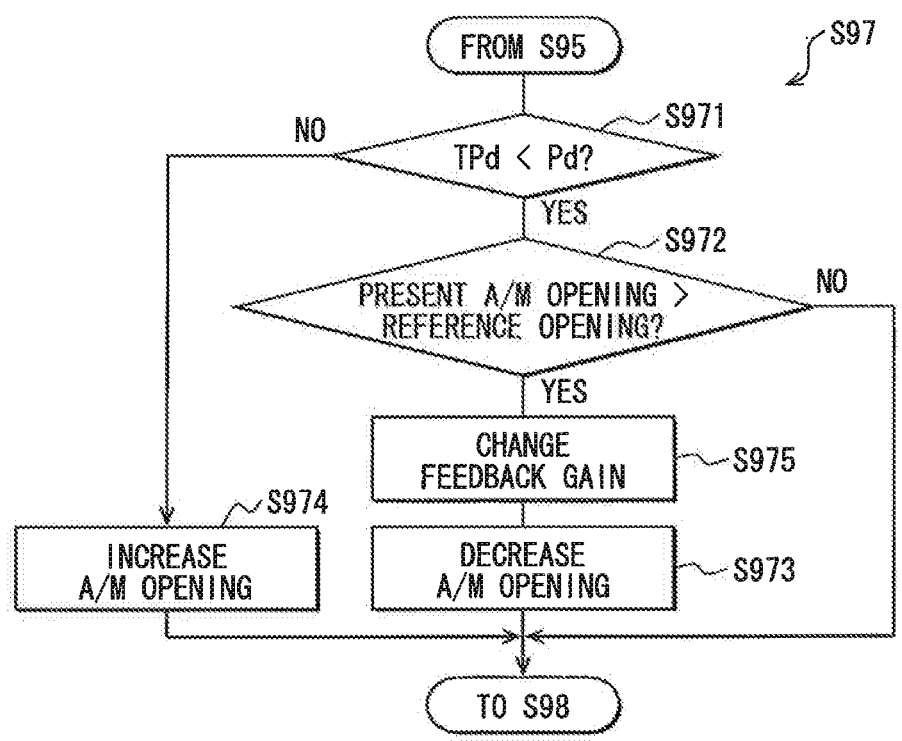
FIG. 22 is a flowchart showing another control process upon performing the air mix volume control in the heating operation mode of a fourth embodiment.

Specifically, in this embodiment, as shown in the flowchart shown in FIG. 22, when the present air mix opening degree SW is determined to be larger than the predetermined reference opening degree (for example, 50%) in step S972, the operation proceeds to step S975, in which a feedback gain K (see mathematical formula F2) is changed. In the step S975, a value provided by subtracting a predetermined value from the predetermined feedback gain K is set as a feedback gain K at this time (K>K').

In subsequent step S973, the control signal to be output to the servo motor of the air mix door 34 is determined based on a target opening degree SWd' provided by decreasing the target opening degree SWd calculated by the formula F1 by a predetermined value, and the feedback gain K' set in step S975.

Thus, the air mix opening degree SW is decreased. After the control signal to be output to the servo motor of the air mix door 34 is determined, the feedback gain K' changed in step S975 is set again to the predetermined feedback gain K.

Other structures and operations are the same as those of the first embodiment. In this embodiment, the heating capacity of the indoor condenser 12 for the feed air can be improved as compared to the dryness control in the air mix volume control.

Figure 23:
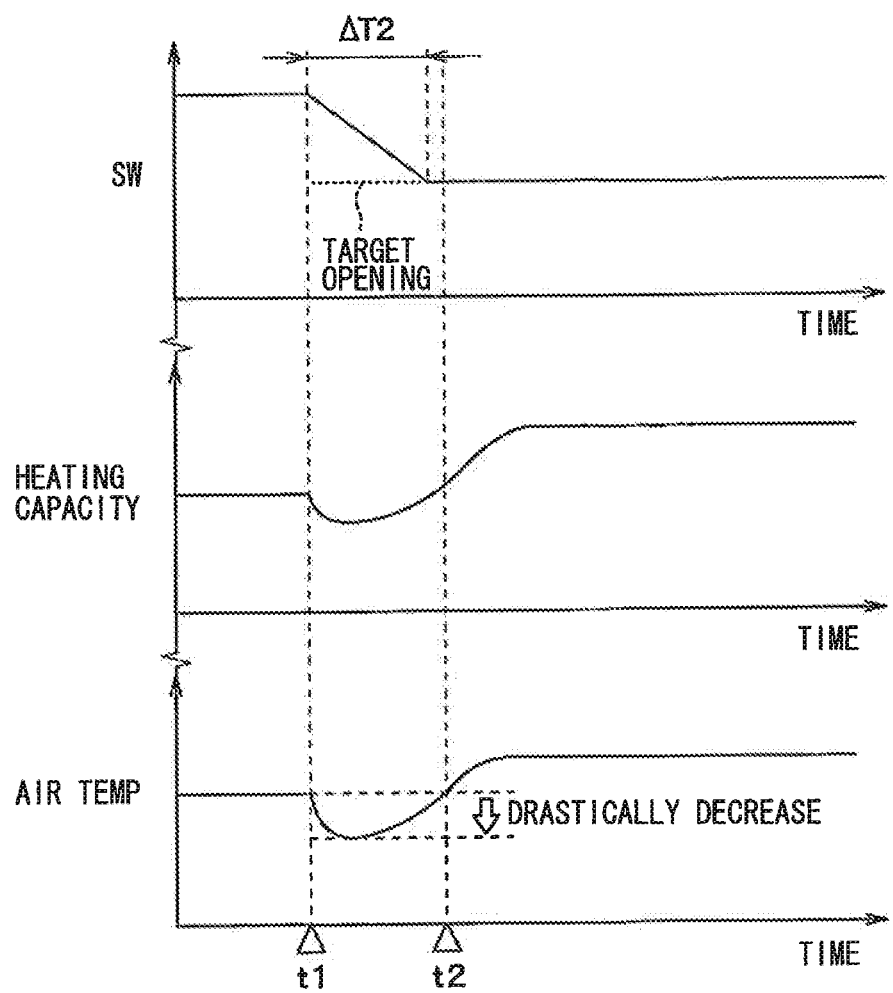
FIG. 23 is a diagram for explaining the changes in opening degree of the air mix door, in heating capacity of an indoor condenser, and in temperature of blown air at the startup of the air mix volume control in the fourth embodiment.

Especially, in this embodiment, as shown in the explanation diagram of FIG. 23, in the air mix volume control, when the air mix opening degree SW is decreased, the responsivity of the operation of the air mix door 34 is delayed (as indicated ΔT1→ΔT2, ΔT1<ΔT2)

Thus, in the air mix volume control, even when the air mix opening degree SW is decreased, the drastic increase in volume of the low-temperature air passing through the bypass passage 35 can be suppressed to thereby reduce the drastic decrease in temperature of the air blown into the vehicle interior. As a result, the reduction in comfort of the vehicle interior in the air mix volume control can be suppressed. Also, in the third embodiment, the feedback gain may be decreased in the air mix volume control like this embodiment.

In this embodiment, in the air mix volume control of the heating operation mode, the responsivity of the operation of the air mix door 34 is delayed. Upon the heating operation mode, the responsivity of the operation of the air mix door 34 is desirably delayed as compared to other operation modes. In this case, for example, the feedback gain of the control of the air mix door 34 in the heating operation mode may be smaller than the feedback gain of the control of the air mix door 34 in other operation modes.

As described about the reasons for this, in the heating operation mode, when the volume of feed air flowing into the indoor condenser 12 is changed, the time required to stabilize the cycle balance of the heat pump cycle 10 tends to be longer than that in other operation modes. While the cycle balance of the heat pump cycle 10 is stabilized, the temperature of the air blown into the vehicle interior tends to deviate from the target outlet air temperature TAO.

Now, reference will be made to a difference in time required to stabilize the cycle balance of the heat pump cycle 10 between the heating operation mode and other operation modes upon changing the volume of feed air flowing into the indoor condenser 12.

First, in the operation mode for closing the intermediate-pressure opening/closing valve 16a, the heat absorbed by the indoor evaporator 23 and the compression work (power) at the compressor 11 dissipate heat at the indoor condenser 12 and the outdoor heat exchanger 20. For example, when the volume of the feed air flowing into the indoor condenser 12 is decreased, the heat dissipated by the indoor condenser 12 is also dissipated from the outdoor heat exchanger 20.

Thus, in the operation mode for closing the intermediate-pressure opening/closing valve 16a, even when the volume of the feed air flowing into the indoor condenser 12 is changed, only the rate of the dissipation heat at the indoor condenser 12 to that at the outdoor heat exchanger 20 is changed, which does not change the cycle balance of the heat pump cycle 10.

In contrast, in the heating operation mode for opening the intermediate-pressure side opening/closing valve 16a, the amount of heat absorbed by the outdoor heat exchanger 20 and the compression work amount (power) in the compressor 11 are dissipated only by the indoor condenser 12. For example, when the volume of feed air flowing into the indoor condenser 12 is decreased, the amount of heat dissipated at the indoor condenser 12 is decreased, which increases the refrigerant pressure of the inside of the indoor condenser 12, As a result, the cycle balance of the heat pump cycle 10 is changed such that the flow rate of the refrigerant flowing into the intermediate-pressure port 11b of the compressor 11 is increased.

Thus, when the volume of the feed air flowing into the indoor condenser 12 is changed in the heating operation mode for opening the intermediate-pressure opening/closing valve 16a, the cycle balance of the heat pump cycle 10 is largely changed.

In this way, as compared to other operation modes, in the heating operation mode, when the volume of the feed air flowing into the indoor condenser 12 is changed, the cycle balance of the heat pump cycle 10 is largely changed. Thus, the time required to stabilize the cycle balance of the heat pump cycle 10 tends to be extended.

Fifth Embodiment

This embodiment will describe a modified example in which the control form of the air mix volume control (control step S97) is changed in the heating operation mode, as compared to the fourth embodiment. In step S97 of this embodiment, in order to improve the comfort of the vehicle interior, when the air mix opening degree SW is decreased, the responsivity of the air mix door 34 is delayed, while reducing the heat exchange capacity between the refrigerant and the feed air in the indoor condenser 12.

When the heat exchange capacity (change in heat amount on the air side) between the refrigerant and the feed air in the indoor condenser 12 is defined as Qca, the heat exchange capacity Qca can be represented by the following formula F3:

$$Qca = \phi c \times Ca \times Gca \times (Tcr - Tca) \quad \text{F3}$$

in which φc in the mathematical formula F3 indicates a temperature efficiency of the indoor condenser 12, Ca indicates an air specific heat, Gca indicates the volume (flow rate) of the air flowing into the indoor condenser 12, Tcr indicates the refrigerant temperature of the indoor condenser 12, and Tca indicates the temperature of air flowing into the indoor condenser 12.

The heat exchange capacity of the indoor condenser 12 is increased in proportion to the volume of air Gca flowing into the indoor condenser 12 as indicated by the mathematical formula F3. The heat exchange capacity of the indoor condenser 12 can be decreased by decreasing the target volume of air from the blower 32.

Figure 24:
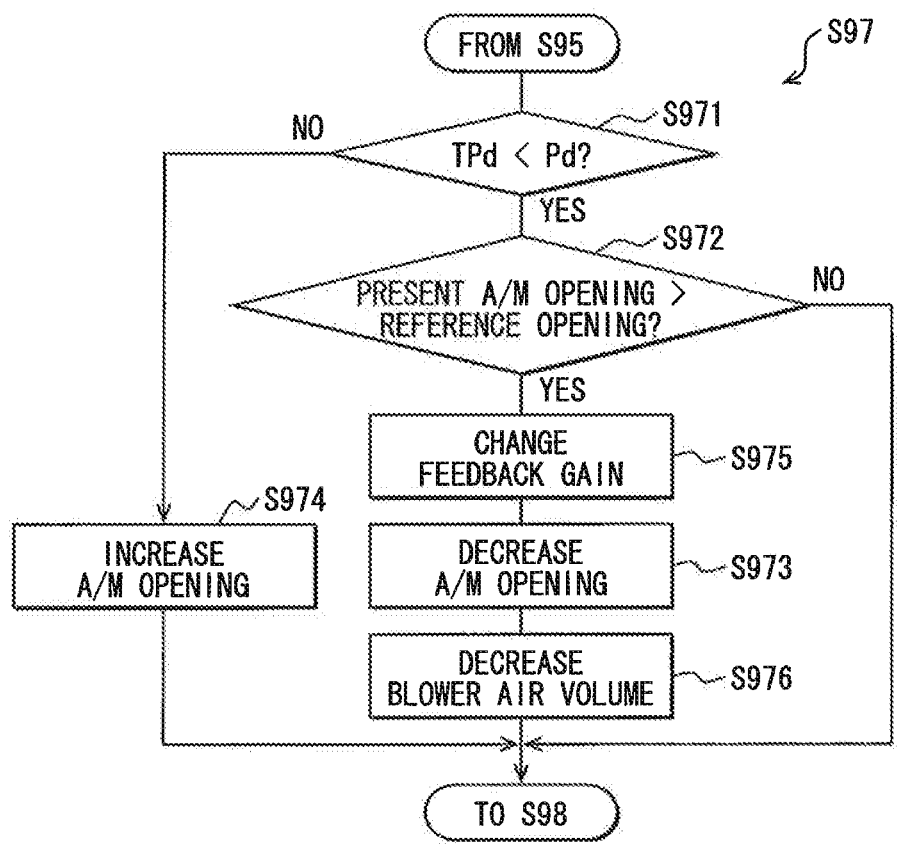
FIG. 24 is a flowchart showing another control process upon performing air mix volume control in the heating operation mode of a fifth embodiment.

Specifically, in this embodiment, as shown in the flowchart of FIG. 24, when the present air mix opening degree SW is determined to be larger than the predetermined reference opening degree (for example, 50%) in step S972, the operation proceeds to step S975, in which a feedback gain K (see the mathematical formula F2) is changed. In step S973, the control signal to be output to the servo motor of the air mix door 34 is determined based on the target opening degree SWd' and the feedback gain K' so as to decrease the air mix opening degree SW.

Further, in step S976, the target volume of air blown by the blower 32 is decreased only by the predetermined air volume, and then the operation proceeds to step S98. When the present target volume of air from the blower 32 becomes the minimum volume, the volume of the air from the blower 32 cannot be decreased as compared to the present value, so that the present target air volume is kept, and then the operation returns to step S98.

Although not shown, when the refrigerant pressure of the inside of the indoor condenser 12 exceeds the predetermined reference pressure after decreasing the air mix opening degree SW, the target volume of the air from the blower 32 is returned to a previous target volume before decreasing in step S976. The reference pressure may be set using, as a reference value, a refrigerant pressure of the indoor condenser 12 obtained when the cycle balance of the heat pump cycle 10 is stabilized in execution of the air mix volume control.

Other structures and operations are the same as those of the first embodiment. Thus, this embodiment can obtain the same effects as those of the fourth embodiment.

Additionally, in this embodiment, upon decreasing the air mix opening degree SW, the target volume of air from the blower 32 is decreased to thereby reduce the heat exchange capacity between the refrigerant and the feed air in the indoor condenser 12. Thus, the air mix volume control of this embodiment can promote the increase in refrigerant pressure of the inside of the indoor condenser 12 to thereby improve the heating capacity of the indoor condenser 12 for the feed air as compared to the fourth embodiment. As a result, the reduction of the comfort of the vehicle interior can be suppressed more effectively in the air mix volume control. In this embodiment, the blower 32 serves as the heat exchange capacity changing portion.

Sixth Embodiment

This embodiment will describe a modified example in which the control form of the air mix volume control (control step S97) is changed in the heating operation mode, as compared to the fifth embodiment. In step S97 of this embodiment, when the air mix opening degree SW is decreased, the inside air whose temperature is higher than the outside air is introduced into the indoor condenser 12 in priority manner to thereby decrease the heat exchange capacity between the refrigerant and the feed air in the indoor condenser 12. In this embodiment, the inside/outside air switching device 33 serves as the heat exchange capacity changing portion.

As indicated by a formula F3 described in the fifth embodiment, when the temperature Tca of the air flowing into the indoor condenser 12 is increased, the difference in temperature between the temperature Tca and a refrigerant temperature Tcr of the inside of the indoor condenser 12 is reduced, which reduces the heat exchange capacity of the indoor condenser 12. That is, the heat exchange capacity Qca of the indoor condenser 12 can be reduced by increasing the temperature Tca of the air flowing into the indoor condenser 12.

Figure 25:
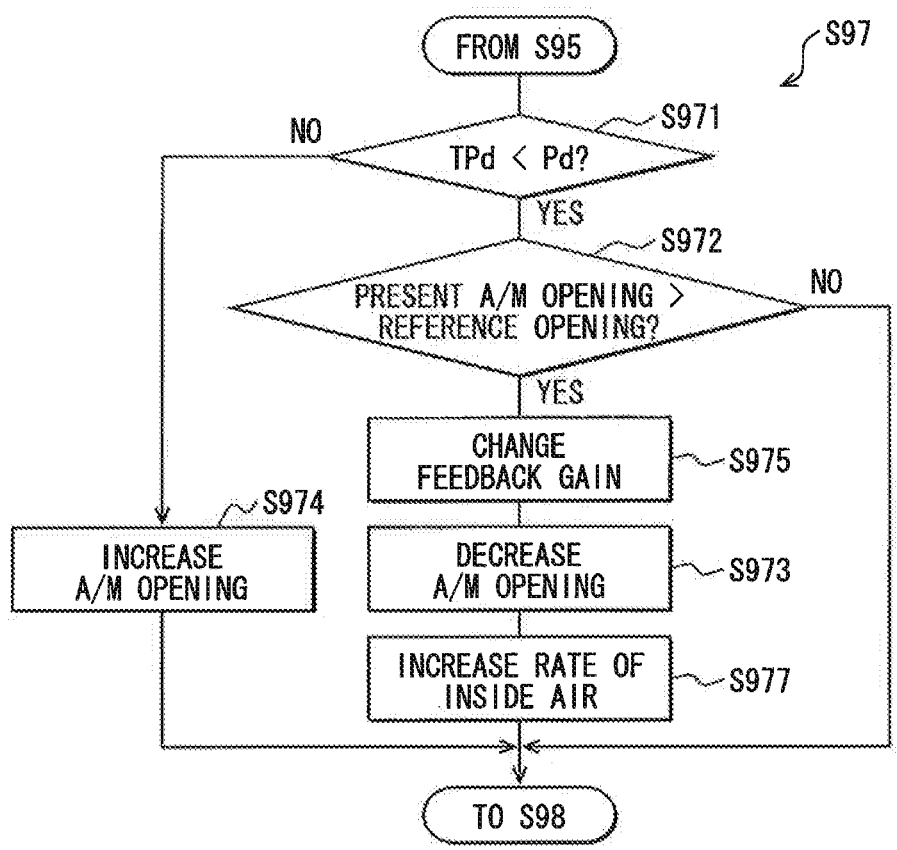
FIG. 25 is a flowchart showing another control process upon performing air mix volume control in the heating operation mode of a sixth embodiment.

Specifically, in this embodiment, as shown in the flowchart of FIG. 25, when the present air mix opening degree SW is determined to be larger than the predetermined reference opening degree (for example, 50%) in step S972, the operation proceeds to step S975, in which the feedback gain K (see the formula F2) is changed. In step S973, the control signal to be output to the servo motor of the air mix door 34 is determined based on the target opening degree SWd' and the feed back gain K' so as to decrease the air mix opening degree SW.

In step S977, in order to allow the inside air at higher temperature than the outside air to flow into the indoor condenser 12, the switching state of the inside/outside switching device 33 is determined so as to increase the rate of introduction of the inside air to the outside air introduced into the air conditioning case 31 (inside air rate). Then, the operation returns to step S98.

Although not shown, when the refrigerant pressure of the indoor condenser 12 exceeds the predetermined reference pressure after decreasing the air mix opening degree SW, the rate of introduction of the inside air to the outside air is returned to the previous one before increase of the rate in step S977. The reference pressure may be set using, as a reference value, the refrigerant pressure of the inside of the indoor condenser 12 obtained when the cycle balance of the heat pump cycle 10 is stabilized upon execution of the air mix volume control.

Other structures and operations are the same as those of the first embodiment. Thus, this embodiment can obtain the same effects as those of the fourth embodiment. In this embodiment, when the air mix opening degree SW is decreased, the rate of introduction of the inside air at a higher temperature than the outside air to the outside air is increased, which reduces the heat exchange capacity between the refrigerant and the feed air in the indoor condenser 12. Thus, even the air mix volume control of this embodiment can obtain the same effects as those of the fifth embodiment.

In the air mix volume control, when the air mix opening degree SW is decreased, the responsivity of the air mix door 34 is delayed, while decreasing the target volume of air from the blower 32. Further, the rate of introduction of the inside air to the outside air introduced into the air conditioning case 31 may be increased.

Other Embodiments

The present disclosure is not limited to the above embodiments, and various modifications and changes can be made to the disclosed embodiments without departing from the scope of the invention as follows.

(1) Although the above embodiment has explained the example in which the refrigerant cycle device of the invention is applied to the vehicle air conditioning device 1 for an electric vehicle, the refrigerant cycle device of the invention is effectively applied to a vehicle in which engine exhaust heat often becomes insufficient as a heat source for heating, for example, like a hybrid vehicle that can obtain a driving force for traveling from both an engine (internal combustion engine) and an electric motor for traveling.

The refrigerant cycle device of the invention may be applied to, for example, a stationary air conditioner, a cool-temperature storage, a liquid heating device, and the like. Further, in application to the liquid heating device, a liquid-refrigerant, heat exchanger is employed as the user-side heat exchanger, and a liquid pump or flow rate adjustment valve may be provided as a flow rate adjustment portion for adjusting the flow rate of liquid flowing into a liquid and refrigerant heat exchanger.

The above embodiments have described the refrigerant cycle devices capable of achieving various operation modes by switching among the refrigerant flow paths. The improvement effect of the heating capacity of the user-side heat exchanger in the invention can be achieved by any cycle that is operated in a refrigerant flow path in at least a gas injection cycle (in the above embodiment, in the heating operation mode).

(2) The above embodiments have described the examples in which the cooling operation mode, the dehumidification and heating operation mode, and the heating operation mode are determined according to the mode selection switch in the control step S6 of FIG. 4. However, the determination of the operation mode is not limited thereto. For example, when the preset temperature is lower than that of the outside air, the cooling operation mode is determined to be performed. In contrast, when the present temperature is lower than the outside air, the cooling operation mode is determined to be executed. When the present temperature is higher than the temperature of the outside air, the heating operation mode may be determined as to be performed.

(3) In the above embodiments, the characteristics of the flow rate of the low-pressure side fixed throttle 17 as the low-pressure side decompressor (second decompressor) is appropriately set, so that the dryness degree X of the refrigerant flowing into the outdoor heat exchanger 20 is equal to or less than 0.1 in the heating operation mode. However, the low-pressure side decompressor (second decompressor) is not limited to a fixed throttle.

That is, a variable throttle mechanism with the same structure as that of the high-pressure side expansion valve 13 may be used as the low-pressure side decompressor. In this case, the air conditioning controller 40 may control the opening degree of the variable throttle mechanism serving as the low-pressure side decompressor such that a detection value of the dryness degree X of the refrigerant flowing into the outdoor heat exchanger 20 detected based on the temperature and pressure of the refrigerant is equal to or less than 0.1.

(4) The above embodiments have described the example in which switching among the first to fourth dehumidification and heating modes is performed in stages with the increase in target outlet air temperature TAO in the dehumidification and heating operation mode. However, the switching from the first to fourth dehumidification and heating modes is not limited thereto. For example, the continuous switching from the first to fourth dehumidification and heating modes may be performed with the increase in target outlet air temperature TAO.

That is, with the increase in target outlet air temperature TAO, the throttle opening degree of the high-pressure side expansion valve 13 may be decreased, and the throttle opening degree of the expansion valve 22 for cooling may be increased. In this way, the throttle opening degree of the high-pressure side expansion valve 13 and the expansion valve 22 for cooling is changed to adjust the pressure (temperature) of the refrigerant at the outdoor heat exchanger 20. Thus, the outdoor heat exchanger 20 can be automatically switched from the state of working as the radiator to the state of working as the evaporator.

(5) In the description of the above embodiment, the control signal to be output to the servo motor of the air mix door 34 is determined by the proportional control (P control). However, the invention is not limited thereto, and the control signal may be determined, for example, by the feedback control, such as PI control, or PID control.

(6) In the above fourth to fifth embodiments, the feedback gain K of the control of the air mix door 34 is changed so as to delay the responsivity of the operation of the air mix door 34 in the heating operation mode under the air mix volume control. However, the invention is not limited thereto. Alternatively, for example, in the heating operation under the air mix volume control, a control cycle of a control signal to be output to the servo motor of the air mix door 34 may be made longer than that of other devices of interest to be controlled, without changing the feedback gain K. Thus, the responsivity of the operation of the air mix door 34 can also be delayed.

What is claimed is:

1. A refrigerant cycle device, being applied to an air conditioner for a vehicle, comprising:
   a two-stage compression compressor configured to compress a low-pressure refrigerant sucked from a suction port and to discharge a high-pressure refrigerant from a discharge port, while allowing an intermediate-pressure refrigerant in a refrigerant cycle to flow thereinto to combine the intermediate-pressure refrigerant with the refrigerant under a compression stage via an intermediate-pressure port;
   a user-side heat exchanger configured to exchange heat between the high-pressure refrigerant discharged from the discharge port and a fluid for heat exchange to thereby heat the fluid for heat exchange;
   a high-pressure side decompressor configured to decompress the high-pressure refrigerant flowing from the user-side heat exchanger into an intermediate-pressure refrigerant;
   a gas-liquid separator configured to separate the intermediate-pressure refrigerant decompressed by the high-pressure side decompressor into gas and liquid phases to flow out the separated gas-phase refrigerant toward the intermediate-pressure port;
   a low-pressure side decompressor configured to decompress the liquid-phase refrigerant separated by the gas-liquid separator into a low-pressure refrigerant;
   an evaporator configured to evaporate the low-pressure refrigerant decompressed by the low-pressure side decompressor and to flow out the refrigerant toward the suction port;
   a flow rate adjustment portion configured to adjust a flow rate of the fluid for heat exchange which is to flow into the user-side heat exchanger; and
   a controller configured to control the flow rate adjustment portion, wherein the fluid for heat exchange is feed air blown into a vehicle compartment, the user-side heat exchanger is disposed in a casing forming therein an air passage for the feed air, and the controller is configured to, when the controller determines that a temperature of the fluid for heat exchange adjusted by at least the user-side heat exchanger is equal to or less than a target temperature of the fluid for heat exchange and the controller determines that the number of revolutions of the two-stage compression compressor is equal to a maximum number of revolutions or the present valve opening of the high-pressure side decompressor is equal to a maximum valve opening, the-controller controls control the flow rate adjustment portion to decrease the flow rate of the fluid for heat exchange which is to flow into the user-side heat exchanger such that a refrigerant pressure within the user-side heat exchanger is increased, whereby a heating capacity in the refrigerant cycle is increased.

2. The refrigerant cycle device according to claim 1, wherein
when the temperature of the fluid for heat exchange adjusted by at least the user-side heat exchanger is equal to or less than the target temperature of the fluid for heat exchange, the high-pressure side decompressor increases a throttle opening degree.

3. The refrigerant cycle device according to claim 1, wherein
a bypass passage is provided in the casing to allow the feed air to bypass the user-side heat exchanger, and
the flow rate adjustment portion includes an air mix door for adjusting a rate of the volume of the feed air passing through the user-side heat exchanger to that of the feed air passing through the bypass passage among the feed airs.

4. The refrigerant cycle device according to claim 3, wherein
the controller includes an air mix door controller configured to control an operation of the air mix door, and
when the temperature of the feed air adjusted by at least the user-side heat exchanger is equal to or less than the target temperature of the feed air, the air mix door controller is adapted to delay responsivity of the operation of the air mix door as compared to when the temperature of the feed air adjusted by the user-side heat exchanger is higher than the target temperature of the feed air.

5. The refrigerant cycle device according to claim 4, further comprising
a heat exchange capacity changing portion configured to change a heat exchange capacity between the refrigerant and the feed air in the user-side heat exchanger, wherein
when the temperature of the feed air adjusted by at least the user-side heat exchanger is equal to or less than the target temperature of the feed air, the heat exchange capacity changing portion reduces the heat exchange capacity.

6. The refrigerant cycle device according to claim 5, wherein
the heat exchange capacity changing portion includes a blower which blows the feed air toward the user-side heat exchanger and the bypass passage, and
when the temperature of the feed air adjusted by at least the user-side heat exchanger is equal or less than the target temperature of the feed air, the blower decreases the volume of the feed air passing through each of the user-side heat exchanger and the bypass passage.

7. The refrigerant cycle device according to claim 5, wherein
the heat exchange capacity changing portion includes an inside/outside air adjustment portion for changing a ratio of introduction of air inside the vehicle compartment to air outside the vehicle compartment into the casing,
when the temperature of the feed air adjusted by at least the user-side heat exchanger is equal to or less than the target temperature of the feed air, the inside/outside air adjustment portion increases the ratio of introduction of the air inside the vehicle compartment to the air outside the vehicle compartment.

8. The refrigerant cycle device according to claim 1, wherein
the flow rate adjustment portion includes a blower for blowing the feed air toward the user-side heat exchanger.

9. The refrigerant cycle device according to claim 2, wherein
the controller controls the flow rate adjustment portion to decrease the flow rate of the fluid for heat exchange, after the high-pressure side decompressor increases the throttle opening degree.

10. The refrigerant cycle device according to claim 2, wherein
the high-pressure side decompressor increases the throttle opening degree, after the controller controls the flow rate adjustment portion to decrease the flow rate of the fluid for heat exchange.

11. The refrigerant cycle device according to claim 6, wherein
the controller includes a blower controller configured to control an operation of the blower, and
when the temperature of the feed air adjusted by at least the user-side heat exchanger is equal to or less than the target temperature of the feed air, the blower controller is adapted to delay responsivity of the operation of the blower as compared to when the temperature of the feed air adjusted by the user-side heat exchanger is higher than the target temperature of the feed air.

12. The refrigerant cycle device according to claim 1, wherein the two-stage compression compressor includes a low-pressure side compression mechanism and a high-pressure side compression mechanism, the suction port is in direct fluid communication with an inlet of the low-pressure side compression mechanism, an outlet of the low-pressure side mechanism and the intermediate-pressure port are in direct fluid communication with an inlet of the high-pressure side compression mechanism.

13. The refrigerant cycle device according to claim 1, further comprising an intermediate-side opening/closing valve disposed between the gas-liquid separator and the intermediate-pressure port, the intermediate-side opening/closing valve is in communication with the controller.

14. A refrigerant cycle device, being applied to an air conditioner for a vehicle, comprising:
a two-stage compression compressor configured to compress a low-pressure refrigerant sucked thereinto from a suction port and to discharge a high-pressure refrigerant from a discharge port, while allowing an intermediate-pressure refrigerant in a refrigerant cycle to flow thereinto to combine the intermediate-pressure refrigerant with the refrigerant under a compression stage via an intermediate-pressure port;

a user-side heat exchanger configured to exchange heat between the high-pressure refrigerant discharged from the discharge port and a fluid for heat exchange to thereby heat the fluid for heat exchange;

a second user-side heat exchanger configured to exchange heat between the refrigerant and the fluid for heat exchange to allow the refrigerant to flow toward the suction port; an outdoor heat exchanger configured to exchange heat between the refrigerant and an outside air;

a first decompressor configured to decompress the refrigerant flowing from the first user-side heat exchanger;

a second decompressor configured to decompress the refrigerant which is to flow into the outdoor heat exchanger;

a third decompressor configured to decompress the refrigerant which is to flow into the second user-side heat exchanger;

a gas-liquid separator configured to separate the refrigerant flowing from the first user-side heat exchanger into gas and liquid phases;

an intermediate-pressure refrigerant passage for guiding the gas-phase refrigerant separated by the gas-liquid separator to the intermediate-pressure port, and mixing the gas-phase refrigerant with the refrigerant under a compression stage;

an accumulator configured to separate the refrigerant flowing into the suction port of the two-stage compression compressor into gas and liquid phases, and causes the separated gas-phase refrigerant to flow to the suction port of the two-stage compression compressor;

a flow rate adjustment portion which adjusts a flow rate of a fluid for heat exchange which is to flow into the user-side heat exchanger;

a refrigerant flow path switching portion configured to switch between refrigerant flow paths through which the refrigerant circulates; and a controller configured to control the flow rate adjustment portion, wherein the fluid for heat exchange is feed air blown into a vehicle compartment, the user-side heat exchanger is disposed in a casing forming therein an air passage for the feed air, in a cooling operation mode for cooling the fluid for heat exchange, the refrigerant flow path switching portion allows the refrigerant flowing from the first user-side heat exchanger to flow through the first decompressor, the gas-liquid separator, the outdoor heat exchanger, the third decompressor, the second user-side heat exchanger, and the accumulator in that order, in a heating operation mode for heating the fluid for heat exchange, the refrigerant flow path switching portion allows the refrigerant flowing from the first user-side heat exchanger to flow through the first decompressor, the gas-liquid separator, the second decompressor, the outdoor heat exchanger, and the accumulator in that order, while allowing the gas-phase refrigerant separated by the liquid-gas separator to flow into the intermediate-pressure refrigerant passage, and in the heating operation mode, the controller is configured to, when the controller determines that a temperature of the fluid for heat exchange adjusted by at least the user-side heat exchanger is equal to or less than the target temperature of the fluid for heat exchange and the controller determines that the number of revolutions of the two-stage compression compressor is equal to a maximum number of revolutions or the present valve opening of the first decompressor is equal to a maximum valve opening, the controller controls control the flow rate adjustment portion to decrease the flow rate of the fluid for heat exchange which is to flow into the user-side heat exchanger such that a refrigerant pressure within the user-side heat exchanger is increased, whereby a heat capacity in the refrigerant cycle is increased.

15. The refrigerant cycle device according to claim 14, wherein the two-stage compression compressor includes a low-pressure side compression mechanism and a high-pressure side compression mechanism, the suction port is in direct fluid communication with an inlet of the low-pressure side compression mechanism, an outlet of the low-pressure side mechanism and the intermediate-pressure port are in direct fluid communication with an inlet of the high-pressure side compression mechanism.

16. The refrigerant cycle device according to claim 14, further comprising an intermediate-side opening/closing valve disposed between the gas-liquid separator and the intermediate-pressure port, the intermediate-side opening/closing valve is in communication with the controller.

17. A method for controlling a refrigerant cycle device, being applied to an air conditioner for a vehicle, the refrigerant cycle device including:

a two-stage compression compressor configured to compress a low-pressure refrigerant sucked from a suction port and to discharge a high-pressure refrigerant from a discharge port, while allowing an intermediate-pressure refrigerant in a refrigerant cycle to flow thereinto to combine the intermediate-pressure refrigerant with the refrigerant under a compression stage via an intermediate-pressure port;

a user-side heat exchanger configured to exchange heat between the high-pressure refrigerant discharged from the discharge port and a fluid for heat exchange to thereby heat the fluid for heat exchange;

a high-pressure side decompressor configured to decompress the high-pressure refrigerant flowing from the user-side heat exchanger into an intermediate-pressure refrigerant;

a gas-liquid separator configured to separate the intermediate-pressure refrigerant decompressed by the high-pressure side decompressor into gas and liquid phases to flow out the separated gas-phase refrigerant toward the intermediate-pressure port;

a low-pressure side decompressor configured to decompress the liquid-phase refrigerant separated by the gas-liquid separator into a low-pressure refrigerant;

an evaporator configured to evaporate the low-pressure refrigerant decompressed by the low-pressure side decompressor and to flow out the refrigerant toward the suction port;

a flow rate adjustment portion configured to adjust a flow rate of the fluid for heat exchange which is to flow into the user-side heat exchanger; and a controller configured to control the flow rate adjustment portion, wherein the fluid for heat exchange is feed air blown into a vehicle compartment, the user-side heat exchanger is disposed in a casing forming therein an air passage for the feed air, the method comprising:

controlling, by the controller, the flow rate adjustment portion to decrease the flow rate of the fluid for heat exchange which is to flow into the user-side heat exchanger such that a refrigerant pressure within the user-side heat exchanger is increased, when controller determines that a temperature of the fluid for heat exchange adjusted by at least the user-side heat exchanger is equal to or less than a target temperature of the fluid for heat exchange and the controller determines that the number of revolutions of the two-stage compression compressor is equal to a maximum number of revolutions or the present valve opening of the high-pressure side decompressor is equal to a maximum valve opening, whereby a heating capacity in the refrigerant cycle is increased.

18. The method according to claim 17, wherein the two-stage compression compressor includes a low-pressure side compression mechanism and a high-pressure side compression mechanism, the suction port is in direct fluid communication with an inlet of the low-pressure side compression mechanism, an outlet of the low-pressure side mechanism and the intermediate-pressure port are in direct fluid communication with an inlet of the high-pressure side compression mechanism.

19. The method according to claim 17, further comprising an intermediate-side opening/closing valve disposed between the gas-liquid separator and the intermediate-pressure port, the intermediate-side opening/closing valve is in communication with the controller.

* * * * *